(12) United States Patent
Tyson, II

(10) Patent No.: US 12,007,220 B2
(45) Date of Patent: *Jun. 11, 2024

(54) OPTICAL STRUCTURAL HEALTH MONITORING

(71) Applicant: John Tyson, II, King of Prussia, PA (US)

(72) Inventor: John Tyson, II, King of Prussia, PA (US)

( * ) Notice: Subject to any disclaimer, the term of this patent is extended or adjusted under 35 U.S.C. 154(b) by 457 days.

This patent is subject to a terminal disclaimer.

(21) Appl. No.: 16/853,591

(22) Filed: Apr. 20, 2020

(65) Prior Publication Data

US 2020/0340802 A1 Oct. 29, 2020

Related U.S. Application Data

(63) Continuation-in-part of application No. 16/236,081, filed on Dec. 28, 2018, now Pat. No. 11,486,697, and
(Continued)

(51) Int. Cl.
*G01B 11/16* (2006.01)
*B25J 15/00* (2006.01)
(Continued)

(52) U.S. Cl.
CPC ........... *G01B 11/16* (2013.01); *B25J 15/0019* (2013.01); *B25J 19/023* (2013.01); *B64C 39/024* (2013.01);
(Continued)

(58) Field of Classification Search
CPC ..... B64F 5/60; G01M 5/0016; G01M 5/0033; G01M 5/0041; G01M 5/0091; G06T 2207/30108; G06T 7/001; G06T 2207/10064; G06T 2207/30156; G06T 2207/30204; G01J 5/00; G01J 2005/0077;
(Continued)

(56) References Cited

U.S. PATENT DOCUMENTS 7,372,558 B2 * 5/2008 Kaufman ........... G01B 11/2513
356/601
10,081,443 B2 * 9/2018 Engel .................. G01M 5/0016
(Continued)

*Primary Examiner* — Deoram Persaud
(74) *Attorney, Agent, or Firm* — Bonini IP Law, LLC; Frank J. Bonini, Jr.

(57) ABSTRACT

Methods, systems and devices for optical structural health monitoring of a subject, including the utilization of pointillism to provide a design or painting of the surface of the structure to be monitored, which also serves as a mechanism for conducting SHM, implementing digital image correlation (DIC) by applying a pattern comprising a random dot pattern and/or codes. The subject is imaged using imaging equipment to capture images of the pattern. For some applications, the captured images of the pattern and codes are stored in a CAD file that represents the subject or portion thereof to which the pattern and codes are applied, and includes the locations of the pattern and codes. Indicia applied to a structure may be applied using a paintjet or inkjet, or robotic mechanism, while some applications implement pre-patterning of a composite sheet that is used to form the structure.

31 Claims, 22 Drawing Sheets
(12 of 22 Drawing Sheet(s) Filed in Color)

Related U.S. Application Data a continuation-in-part of application No. 16/236,072, filed on Dec. 28, 2018, now Pat. No. 11,132,479.

(60) Provisional application No. 62/750,012, filed on Oct. 24, 2018, provisional application No. 62/612,181, filed on Dec. 29, 2017.

(51) Int. Cl.

| | | |
|---|---|---|
| *B25J 19/02* | (2006.01) | |
| *B64C 39/02* | (2023.01) | |
| *B64U 101/30* | (2023.01) | |
| *G01J 5/00* | (2022.01) | |
| *G01J 5/48* | (2022.01) | |
| *G06K 19/06* | (2006.01) | |
| *G06T 7/00* | (2017.01) | |

(52) U.S. Cl.
CPC .......... *G01J 5/00* (2013.01); *G06K 19/06037* (2013.01); *G06T 7/001* (2013.01); *B64U 2101/30* (2023.01); *G01J 5/48* (2013.01); *G06T 2207/30108* (2013.01)

(58) Field of Classification Search
CPC ..... G01J 5/48; G06K 19/06037; G01B 11/16; G01B 11/165; B64C 2201/123; B64C 39/024; B64C 2201/042; B64C 2201/126; B64C 2201/141; B64C 2201/148; B25J 15/0019; B25J 19/023
See application file for complete search history.

(56) References Cited

U.S. PATENT DOCUMENTS

| | | | |
|---|---|---|---|
| 10,226,944 B2* | 3/2019 | Kerr | B25J 11/0075 |
| 10,497,110 B2* | 12/2019 | Szarski | G06T 7/38 |
| 2005/0082262 A1* | 4/2005 | Rueb | G01S 5/16 |
| | | | 219/121.6 |
| 2007/0105696 A1* | 5/2007 | Castel | A63B 21/0552 |
| | | | 482/121 |
| 2007/0127015 A1* | 6/2007 | Palmateer | G01B 11/25 |
| | | | 356/237.1 |
| 2009/0195753 A1* | 8/2009 | Dill | G03B 21/26 |
| | | | 353/30 |
| 2010/0235037 A1* | 9/2010 | Vian | G07C 5/008 |
| | | | 702/183 |
| 2010/0310128 A1* | 12/2010 | Iliopoulos | G06T 7/246 |
| | | | 382/209 |
| 2012/0219699 A1* | 8/2012 | Pettersson | B05B 12/124 |
| | | | 427/8 |
| 2014/0098936 A1* | 4/2014 | Grossnickle | G01N 23/087 |
| | | | 428/209 |
| 2014/0099472 A1* | 4/2014 | Greenhill | A63B 71/10 |
| | | | 427/532 |
| 2015/0043011 A1* | 2/2015 | Kaufman | G01B 11/245 |
| | | | 356/614 |
| 2015/0350617 A1* | 12/2015 | Chevassus | H04N 9/3191 |
| | | | 348/745 |
| 2016/0264262 A1* | 9/2016 | Colin | B25J 5/007 |
| 2017/0016862 A1* | 1/2017 | Holmes | G01N 29/30 |
| 2017/0052150 A1* | 2/2017 | Zalameda | G01N 29/043 |
| 2017/0210489 A1* | 7/2017 | Bode | G05B 19/41805 |
| 2017/0281009 A1* | 10/2017 | Obropta, Jr. | A61B 5/442 |
| 2018/0335296 A1* | 11/2018 | Golovashchenko | G06T 7/62 |
| 2019/0265200 A1* | 8/2019 | Ihn | G01M 5/0091 |
| 2019/0310076 A1* | 10/2019 | Georgeson | G01L 1/24 |
| 2020/0230899 A1* | 7/2020 | Tyson, II | G01N 21/88 |

* cited by examiner

Sample QR Code (2D barcode)

ARAMIS Result of Barely Visible Damage (BVD) under UV illumination 2010  2021                    2022  2023

OPTICAL STRUCTURAL HEALTH MONITORING

CROSS-REFERENCE TO RELATED APPLICATIONS

This application is a continuation-in-part of U.S. patent application Ser. No. 16/236,081, filed on Dec. 28, 2018, and of U.S. patent application Ser. No. 16/236,072, filed on Dec. 28, 2018, and claims the benefit to U.S. Provisional Application 62/750,012, filed on Oct. 24, 2018, and U.S. Provisional Application 62/612,181, filed on Dec. 29, 2017; the entire contents of the aforementioned applications of which are incorporated herein by reference.

BACKGROUND OF THE INVENTION

1. Field of the Invention

The present invention relates to the field of inspection and monitoring of structures and components, and in particular to methods, systems and devices for measuring strain and deformities that may exist in a structure or object, including those occurring over time.

2. Brief Description of the Related Art

Components and structures that are in use and subjected to forces typically are monitored to determine whether changes have taken place that may render the structure or component unsuitable for use. For example, in the field of aircrafts, currently, most aircraft inspection is based on human Visual Inspection (VI), where the inspector looks at each component and makes a determination if the part is healthy or not. This is done by the pilot before each flight with a walk around the aircraft, and continues on for maintenance A, B, C & D Checks, each being more detailed. The checks are carried out at predetermined times based on the number of flight cycles (i.e., landings and take-offs) or flight time. An A-Check is a light check, which may be carried out usually overnight, at an airport gate. The A-Check is carried out monthly, or every 500 flight hours, although this timing may change depending on the aircraft type. The B-Check also is a light check and typically is carried overnight at an airport gate, about every three months. A C-Check is carried out on an aircraft every 18 months to two years (depending on type of aircraft) and usually takes about three weeks. An aircraft may undergo upgrades, e.g., to the interior, which may be coordinated with the C-Check timing. The D-Check is the most extensive. During a typical D-Check, about every 5 to 6 years, depending on the aircraft type. During a typical D-Check the interior is removed and the inside of the fuselage, including the skin, frames and stringers, is visually inspected. There are also may be specific requirements to test specific structures with a nondestructive testing (NDT) methods like eddy current or ultrasonics to detect cracks or corrosion (e.g., or other monitored FAA tests). When the D-Check is carried out, the entire aircraft is basically dismantled and put back together. For example, components in the cabin are taken out (such as the seats, toilets, galleys, and overhead bins) in order to allow the engineers access to inspect the metal skin of the aircraft, from the inside out. But the D-Check not only involves the interior, the engines also are taken off, and the landing gear is removed and overhauled with the aircraft supported on massive jacks. All of the aircraft systems are taken apart, checked, repaired or replaced and reinstalled. The cost of carrying out a D-Check on an aircraft is substantial, involving several million dollars for each D-Check, and the aircraft typically is our of service, as the D-Check usually will take about three to six weeks to complete. In some instances, an aircraft will need to be relocated to an inspection facility where the D-Check may be carried out.

A number of next generation aircraft are being made more of composite structures, which do not show their damage well visually. They typically carry strain without noticeable changes until catastrophic failure, typically complete fracture, like a composite fishing rod that bends and bends until it snaps.

In addition, structural monitoring of the condition or health of structures is important for structures in space. Currently, the only spacecraft/space station structural inspection is performed by camera either fixed on the vehicle or on the Canada Arm (Shuttle/Intl. Space Station) for vehicle inspection coupled, with possible laser scanning for shape. These were inspired by the Columbia Space Shuttle crash, and the inability to inspect the damage from the SOFI foam impact during launch.

This work is currently run by a person watching the results by trying to see if something is not right, like an impact or other noticeable damage, and using the laser scanner to measure the results.

Structural Health Monitoring (SHM) on aircraft was reviewed by the US Army, which showed the benefit to the US Army to be about 20% of the aircraft program for better operations, predictive maintenance and extended lifetime.

Future needs for spacecraft and space stations (which are collectively referred to herein as spacecraft) will have need for regular inspection of the outside surface of the vehicle for damage and degradation.

Typical structures are the inflatable habitats invented at NASA Johnson and developed by Bigelow Aerospace. Two are currently in orbit; one in free flight and one on the Int'l Space Station (ISS). These tough, inflatable structures prevent micrometeorite penetration with an advanced woven composite structure, but the surface is damaged by the impact. Inspection of shape, deformation, strain and thermal response are critical measurements for the survivability and repair of these structures.

A need exists for a device and method that will provide the capability for monitoring the structures in space, such as spacecraft, space stations and other articles deployed in or operating in space.

SUMMARY OF THE INVENTION

The present invention provides a method, system and devices for Optical Structural Health Monitoring. According to preferred embodiments, Optical Structural Health Monitoring is carried out with an optical strain measuring tool, and preferably, with a technology referred to as Digital Image Correlation (DIC). DIC uses an applied pattern on the surface of a material to measure its surface strain, like a single point electrical strain gauge, but can image the entire surface of the materials, imaging the true material strain, like a computer model or Finite Element Analysis (FEA) models this strain.

According to preferred embodiments, the system, method and devices may be used to conduct structural health monitoring without the need to contact the substrate or item being monitored or evaluated. The structural health monitoring may be carried out in real-time, so that there is no requirement for on-board sensors or equipment, with weight and requiring power (weight and power requirements being detriments to aircraft operations).

According to some embodiments, the measurements preferably take place on a paint pattern, which may be an embedded pattern of a coating, such as paint (e.g., a paint pattern). According to some implementations, the pattern may be applied to a substrate, and remain visible thereon, while other embodiments may provide an invisible pattern and/or codes. According to some embodiments, the measurements preferably take place on an embedded UV pattern placed on the substrate that is to be measured over time (e.g., using a UV coating, such as a UV paint or ink). DIC may be implemented using the pattern, such as the visible pattern indicia according to some embodiments, and the UV pattern indicia according to other embodiments to conduct the structural health monitoring.

The system preferably includes a computer or server with a database, and software containing instructions for storing the images and their UV patterns (or in some embodiments the visible patterns) for the structure of interest, taken at different time intervals (e.g., periods of use, periods of inactivity, or other metric), from which comparative measurements may be made to determine one or more structural health parameters, such as strain, deformation, and other stresses or averse conditions that may be detected from one interval to another (e.g., between measurements).

In carrying out the Digital Image Correlation, One of the requirements of DIC is to image a pattern is imaged on the surface of an object, the pattern typically consisting of a random dot pattern of specific sizes, like a leopard pattern across the entire surface of the material that stays with the part, "measuring" it. The initial pattern measurement provides the initial 3D coordinates of the material surface. The initial pattern measurement may be considered to be a baseline for the known condition at the time at which the pattern is applied. Each successive 3D imaging measurement compares the changes in 3D displacement (deformation, like bending), and local surface strain (material stretching to fracture), which detects pre-fracturing and cracking (failure). The subsequent measurements involve imaging the object to detect the pattern, and identify areas where the pattern has changed. For example, in the case of a dot pattern, the dots forming the pattern are at locations at the initial baseline imaging. Where the dots are in different locations, the position to which a dot has moved, as well as the extent and direction of movement (for example along coordinates, such as, for example, an x,y,z coordinate system) may be ascertained.

Patterning internal structures (such as for a D check, with enhanced visual inspection for structural health monitoring) with a quality analysis pattern, is a concern before acceptance of the technology, because it can hide issues from the accepted human visual inspection. Apart from the potential for visual distraction during inspections, typically, most owners of the asset being monitored do not want the outside of their structure, such as an airplane, painted with dots. Some embodiments of the system, method and devices may be implemented with an invisible paint or coating, such as a UV paint, as the UV pattern does not hide or inhibit visual inspections, and is suitable for a number of applications (where visible patterns would inhibit or detract from the surface or object).

The present method, system and devices provide patterning methods, including an invisible patterning method that may be seamlessly integrated with existing structures as well as the appearances of the structures. The method, system and devices may be used to carry out structural health monitoring of structures without disrupting the appearance of the structure. According to embodiments, the method, system and devices provide an invisible pattern that may be imbedded into the normal paint used.

According to preferred embodiments, a coating is used, such as a paint or ink, that contains a substance that is not visible under normal viewing conditions, but is visible in the presence of light of a particular wavelength, such as fluorescent or UV spectral wavelength light, making the applied pattern and codes ascertainable during an inspection. The use of the revealing light, in some circumstances may be visible only to a camera having an image sensor that covers the wavelength of the dye compound or additive, while in other embodiments, the use of a light of a suitable wavelength may also reveal to humans a visual appearance of the pattern on the structure.

According to a preferred embodiment, a fluorescent dye is provided in the paint or other coating formulation that is used to create the pattern. For example, where a UV fluorescing compound is provided in the coating applied to form the pattern, the method then employs the use of an Ultraviolet (UV) light to see the pattern during an inspection. The pattern is provided on the structure, however it does not inhibit visual inspection, nor is it seen on the surfaces.

One of the requirements of Optical Structural Health Monitoring with DIC is to image the initial condition of the structures from which to compare any changes. Structural health monitoring measures the quality of structures for years, so storing the information for years is critical. Aircraft, bridges and buildings have very large surface areas. The method provides the capability to recover the initial image(s) of the same area as that being measured, simply and automatically.

Optical structural health monitoring (SHM), conducted according to embodiments of the system, method and devices, may also be used for interior skin measurements of an aircraft or other structure, providing enhanced visual inspection. For example, the utilization of ARAMIS to inspect the patterns may provide the power of millions of strain gages. This may be used for crack detection and the plastic strain of overloaded structures, like frames (radial), and stringers (axial) of an aircraft.

The method is carried out by obtaining a precise position and orientation of the imaging device so that the reference point from which the pattern is imaged although relative to the location of the imaging device, is known based on the imaging device position. Knowing precisely the position and orientation of the imaging device is critical. The present system, method, and devices may utilize information in the image to determine the position and orientation. According to some implementations, the information in the image may be used for knowing position and orientation. According to some embodiments, a random dot pattern may be used to determine the position and orientation of the imaging device. Although preferably a random dot pattern is different everywhere or almost everywhere (hence the randomness), it may be used, but it may be difficult to compare with the original and/or last previous location of that pattern or pattern portion.

According to some other embodiments, a specific dot pattern may be used and cataloged.

According to preferred embodiments, the imaging device position and orientation is determined with the use of coded markers in the field of view. The coded markers may be numerically unique, which provides for more distinctions for discrete markings and their identifications.

According to some preferred implementations, the method, system and devices utilize 2D QR codes, and may mark these on the structure. Embodiments of the method system and devices imprint onto the surface of a structure information that may serve as an orientation and position indicator, as well as a part repository of part specific information. According to preferred embodiments, a QR code utilized in the present method and system may provide the component information as well as serve as position and orientation designators. According to preferred embodiments, the QR code may store substantial information, like part no., serial no., location, and other details. Embodiments of the present method and system also utilize QR codes that are finely printed and may be used by DIC as its local random pattern. The use of the QR code as a local random pattern for which DIC measurements may be ascertained, may be applied to the structure surface in a manner and in locations that does not block the surface measurements.

According to preferred embodiments, one or more QR codes are applied onto a surface of the structure or asset to be monitored, and preferably, the one or more QR codes are applied on the surface, and a pattern, such as for example a random dot pattern, also is applied on the surface. According to some embodiments, the patterns are non-overlapping patterns or codes, or patterns and codes are provided having different frequencies of excitation, or wavelength (e.g., different colors). For example, when exposed to light of a particular wavelength, one pattern or code may be revealed (e.g., such as a first pattern), whereas when exposed to another wavelength (or frequency), another pattern (such as a second pattern) may be revealed, but not the first pattern. For example, codes may be applied using a particular paint having a first wavelength or frequency for viewing, which is different than other patterns applied. The codes also may be security protected, so that even if revealed (using an appropriate wavelength of light) the code cannot be read without a decoder (which may be included or provided as part of the system). The QR code that has been applied to the surface of an asset to be monitored may be used by imaging to identify a position on the part, the part number, serial number, age, location (and/or other information), and provide a reference for the other indicia of the pattern (the dots of the random dot pattern). Preferably, the codes, such as a QR code, or circular code, or numerical code or combinations of these codes are applied to the surface of a structure along with the random dot pattern, so that the structure is marked with codes and a pattern.

According to preferred implementations, the pattern and the QR codes may be printed with an inkjet (paintjet) printing capability. The inkjet/paintjet printer preferably includes a print head with at least one, and preferably an array of fine nozzles, which is carried on a movable support. According to a preferred implementation, the movable support with the print head thereon is moved over the surface of the part to which the codes and/or pattern are to be applied, and the nozzles dispense the application compound (such as a paint, ink or dye) in the desired locations on the part surface. The print head may be configured to be part or location specific, or customized to provide the application of the coating (e.g., paint or ink) in the location or locations of the part desired. Preferably, the compound being applied through the inkjet or paintjet nozzles contains a compound, such as a UV fluorescing compound, that will exhibit visibility only under certain wavelengths, and not the lighting conditions under which the subject part is typically used.

According to some embodiments, the pattern and codes may be applied to the surface of the structure with a robotic mechanism. For example, according to some embodiments, a robot that has one or movable arms, or segmented arms may be provisioned with a print head thereon. The print head and robot preferably may be connected to a computer or other device that includes software and a hardware processor for controlling the movements of the robot over the surface of the part, and for controlling the printer head to print a pattern onto the surface of a panel as well as to print codes, such as QR codes. In addition to the use of a robot for application of the pattern and codes, the robot may also be used to image the pattern and codes on structure during monitoring and measuring operations.

According to preferred embodiments, the pattern is applied to the structure as an invisible pattern. The invisible pattern is preferably one that is not visible to the human eye under normal lighting conditions (conditions of use of the structure or part). For example, where the structure is designed to be used in a normal course of operations, such as a motor vehicle, aircraft, or other item, the exterior surface appearance may be maintained as the customer or owner of the substrate (vehicle, aircraft, or other item) may desire (e.g., with the customer color scheme and/or logos). According to preferred embodiments, an ink is used that may be viewed and imaged by an imaging component, such as a camera, but which may not be visible when viewed unassisted by some type of viewing technology. A preferred implementation is to provide a UV fluorescing substance, such as an ink or paint, which preferably is not visible during normal light conditions. The UV paint may be visible in one or more spectral regions, such as, for example, the ultraviolet spectral region, or at one or more particular wavelengths, where imaging instruments, such as a camera having an image sensor that can detect UV light or the spectral wavelength range of the paint or ink, may capture the UV paint pattern on the substrate. Preferred embodiments capture the UV fluorescence of the substance such as the paint or ink comprising the pattern. According to some embodiments, the UV patterning and codes are applied over the surface of the substrate. In some embodiments, a UV coating, such as UV paint, is applied on top of the existing surface, including over a surface treatment, such as a surface color or painted surface. For example, the UV patterning and code applications may include applying the UV paint or ink directly on the substrate surface, including even on an image that is on the substrate surface, such as for example, surface paint, logos, stripings, or designs of the substrate (e.g., an aircraft logo).

According to some other embodiments, the UV pattern paint or ink is mixed with the surface color or paint and is applied to provide the pattern, but in a manner where the color of the structure (natural color or painted color) is matched to the UV ink or paint. In this manner, although the UV pattern may be applied, the pattern is not noticeable to a viewer, but may be detectable under certain lighting conditions (e.g., UV wavelength lighting). According to some alternate embodiments, the surface may be further treated with a coating that preserves the UV applied indicia (e.g., pattern and codes). For example, according to some embodiments a clear coat (overcoat) may be applied over the UV applied paint or ink to provide additional protection for the UV ink or paint (and which permits the imaging of the UV pattern through the overcoating).

In order to view the UV applied pattern (and codes) an imaging component that has a sensor that may capture the UV light from the pattern is used. A UV light source may be directed at the structure, and the UV pattern will be revealed. The imaging system, which may comprise a camera may then, under conditions where the UV pattern is exposed to UV light, image the pattern and store the images. This may be done in one or more image captures.

The UV applied pattern preferably is one that has long-term pattern survivability. Therefore, when a structure being monitored is tested, the UV pattern survives at least an initial testing period, and may survive over multiple monitoring cycles. For example, the UV pattern may be provided to remain on the structure, such as, an aircraft for example, between one or more successive A-Checks, or B-Checks, or for longer durations.

In the case where the UV pattern is imaged, it can provide a baseline for subsequent measurements. For example, the UV pattern may be coordinated with the CAD file coordinates of the substrate. The pattern and substrate may be imaged together and the UV pattern stored as coordinates (e.g., x-y-z-system). If some of the pattern remains, it may be used in reference to the saved coordinates. Using invisible UV fluorescing pattern the component can be tracked with thousands of measurement points. A CAD based database containing the part information, including the CAD coordinates, is utilized in conjunction with the imaging pattern. According to some embodiments, the UV patterning is carried out in connection with the RVAT system, which records the as-built structure or component assembly, and represents the actual part built in CAD. An RVAT database may be generated or supplied that includes the CAD information for the substrate (such as a part or assembly) to which the UV patterning is applied. The RVAT database preferably includes the as-built information, including the CAD information for the actual substrate part, which may be termed a Digital-Twin. The application of a UV fluorescing pattern and codes to a substrate, such as, for example, a surface of a vehicle, aircraft or article of manufacture, permits the imaging evaluation to detect changes in the structure, even when the changes may not be visible to a human inspection. Documenting every measurement within the RVAT Database (the Digital-Twin), RVAT Analytics can see slight variations in response, exposing structural defects. RVAT Dimensional NDE Structural Health Monitoring provides: Detection of Local Shape (3D Deformation) Change for detection of Barely Visible Damage to substantial internal damage, and Detection Local Strain Change for detection of structural damage to substantial internal damage. The UV pattern application may be used in conjunction with one or more other structural health monitoring applications, such as, for example, thermography (e.g., NDE thermography). RVAT Thermal Response NDE Structural Health Monitoring provides early detection of delaminations, water intrusion and other defects or conditions. Continuous RVAT Structural Health Monitoring allows designers to reduce design safety factors reducing cost and increasing performance. The pattern applications may be used in conjunction with RVAT Thermal Response NDE Structural Health Monitoring.

The RVAT system and Digital-Twin are shown and described in my co-pending U.S. patent application Ser. No. 62/612,181, filed on Dec. 29, 2017, and my co-pending U.S. patent application Ser. No. 16/236,072, filed on Dec. 28, 2018, the complete contents of those patent applications of which are herein incorporated by reference.

The UV pattern may be captured by the imaging component, such as a camera, and stored at each interval at which the structure is evaluated. A database of structural health may be produced, capturing and storing date for the structure over time, and identifying the pattern and codes on the structure, and changes to the structure based on the changes to the pattern and codes. However, according to some embodiments, the codes are configured and applied so as to retain suitable integrity for identifying the information that the code represents (e.g., part number, serial number). According to other embodiments, the codes themselves are provided in any location, including where strain or other monitored condition, may be expected to occur. In some embodiments, a code may be applied at particular location or locations on the structure.

The UV pattern itself may be compared to the previous imaged pattern (which was stored in a database from the previous pattern imaging, e.g., a prior health check), or from the initial condition when the pattern was first applied. The UV pattern may be compared using the CAD related stored information where the UV pattern from a previous or initial imaging, has been stored and represented in CAD (such as using the RVAT technology application). The structural health monitoring enables the detection of problems that are likely to arise, and provides the capability to detect these potential problems at an advance time (before the actual damage is no longer repairable, or results in a detrimental failure event). It is noted that the pattern and codes may be applied to a structure before the structure is placed in use, or alternatively, may be applied to an in-use structure, and may be reapplied to a structure when required (when the pattern has worn, or when the structure has been altered—repaired or repainted, or other transformation). For example, where a UV pattern previously applied no longer is present in a suitable amount or degree to ascertain measurements, the pattern may be reapplied. Knowing the UV pattern longevity application, or useful life (which may depend on certain exposures to elements, weather, chemicals, and other conditions), may be used to determine when reapplication of the pattern is required. For example, during repainting or certain refurbishments of a structure to which the UV pattern has been applied, the pattern may be reapplied as needed, e.g., where a substrate, such as an aircraft is undergoing repainting.

The present system, method and devices preferably are utilized in conjunction with CAD coordinates. The present system includes one or more databases which store information about the substrate. A database needs store the information of every image based on 3D coordinates or positional information. Our RVAT database product, stores the initial 3D computer design drawings (CAD/FEA), the initial 3D scan (3D measurement of part), the initial structure DIC patterns and the coded marker locations, as well as any other Digital Thread data associated with the part. The RVAT database allows the link between the current measurement image with the entire digital thread of the structures life.

According to some alternate embodiments and implementations, the methods and devices may be carried out to provide optical structural health monitoring by implementing a patterning system that integrates an application of a surface application, such as a customized paint application, which provides an aesthetic surface that the end user of the structure desires. For example, in the case of surfaces such as aircrafts, machines, and appliances, the end user may desire a logo, name or color scheme design. A professional quality beautiful paint job is desired. The present structural health monitoring, and the RVAT implementations of the SHM preferably may be carried out using fine and precise pattern to allow measurement of small strains, 3D shape and displacements. The French artist Georges-Pierre Surat pioneered Pointillism, painting beautiful pictures seen from afar, yet made from dots of color. The 3D imaging system utilized in conjunction with the embodiments for full-field strain measurement, such as, for example, the ARAMIS 3D DIC system, utilizes dots, but it does not care what color they are. In addition, filters can be used to augment the contrast of the colors seen by the camera(s) critical for precision measurements. In addition, 2D QR codes (or similar coded markers) may be detected in a wide variety of colors, allowing for local image location on the vehicle or structure. For example, the QR codes themselves may be applied using a matrix of small dots used to form the image of the code.

The methods, system and devices herein are designed to provide an advanced (futuristic) paint job that will look good and be of sufficient quality for commercial usage (e.g., on an aircraft, vehicle, or other structure to be monitored), and have a multi-functional nature, as a structural health monitoring coating for use with the SHM disclosed herein, as well as providing safety, predictive maintenance, and life extension. In addition, the utilization of the pointillism can also cover up minor painting flaws, allowing for less paint to be used and no fillers required, reducing weight of aircraft.

According to some embodiments, patterning may be carried out using an application of indicia, such as a paint scheme, on a structure. An aircraft, for example, may be painted with a design, including a logo. The paint application preferably comprises a suitable application that permits optical structural health monitoring to be implemented, and according to some embodiments pointillism is utilized, so that the paint of a design, including a design element and/or background on the structure surface, or a location of the structure or surface to be monitored (if not eh entire structure), is formed by a pattern of dots, points or small shapes. The patterning may be applied with a suitable painting mechanism, including paintjet or robots that traverse the surface and propel paint from one or more controlled nozzles or delivery means to provide the pattern on the surface. According to some embodiments, color schemes may be used, and contrasting colors may be provided to enhance the visualization of the individual pattern elements (such as the dots), when they are imaged. Other mechanisms involve imaging the pattern with the use of a filter, such as, for example, a color filter or other type filter that will improve or enhance the differentiation among the pattern elements, such as increase the contrast. Color filters, may be used to enhance or diminish a particular color that certain of the pattern elements may exhibit. Other types of filters may include polarization filters.

According to some embodiments, the system, method and devices are provided for conducting optical structural health monitoring in space. Space Optical Structural Health Monitoring (SOSHM) is a critical tool for next generation spacecraft. Micrometeorites, solar radiation and cosmic rays damage and degrade exposed spacecraft structures. The present method for monitoring the structural health of, and according to some embodiments even repairing spacecraft may be implemented with a device comprising an autonomous cube satellite or similar small drone satellite that is able to fly around the vehicle or structure to be inspected, imaging the surface with a photogrammetry system or stereo photogrammetry system with 3D Digital Image Correlation (3D-DIC or DIC) for strain measurement and/or thermal camera for thermal response.

Photogrammetry involves coded markers for locating the camera in space and points for measurement of 3D coordinates. DIC may be carried out using the same camera system discussed herein in connection with the other embodiments, which preferably uses an applied pattern on the surface of a material to measure its 3D shape, deformation and surface strain, imaging the entire surface of the spacecraft. The photogrammetry targets are used to locate the DIC image on the spacecraft surface, aligning it with previous results.

Not only is measuring the current condition important, but also comparing it to its historical condition is critical to understanding changes that have occurred, allowing small damages to be detected and tracked for worsening conditions. Accurate location of each image using the photogrammetry targets and a database of previous measurements allows the system to automatically see changes in the structure, which can be related to various damage types and conditions.

According to some implementations, an inspection drone is provided. The inspection drone preferably self-docks in the spacecraft to recharge batteries for electricity and gas storage for maneuvering. The inspection drone, on a regular basis, may maneuver around the spacecraft at a proper working distance, imaging every square foot of the spacecraft surface, documenting its structural integrity. Photogrammetry targets on the surface will align the inspection drone's data with the historical data of the spacecraft structural and integrity. Imaging of 3D shape, deformation and strain adding to the historical knowledge of if the spacecraft's historical structure integrity. This historical analytics will show any slight variations caused by deep space degradation. Pulsed-thermal thermography will provide non-contact NDT of the spacecraft surface as needed. Damaged areas may be autonomously repaired with simple adhesive and fiber patches. This work may be performed autonomously, providing continuous inspection and simple repairs, while reporting spacecraft structure integrity throughout the life of a spacecraft. When supplies become low, the inspection drone can return to its dock, to be recharged with power, maneuvering gas and supplies. When recharged it can return to its inspection task, returning to its previous location to continue the inspection. The inspection surveys can be performed on a regular basis, daily, weekly, monthly, as needed, inspecting, documenting and reporting the structural health of the spacecraft throughout the life of the spacecraft.

The inspection drone may require neutral density filters for inspecting the sun-side of the spacecraft, while using lights to illuminate the dark side. Accordingly, the inspection drone may be fitted with filters and/or lights that may be actuated as needed for the desired inspection. In another configuration, the inspection drone may have a thermal camera and a thermal heat source, preferably a flashlamp like a xenon flashlamp, to provide non-contact thermal excitation of the surface for non-destructive testing of the local material, particularly for detecting delaminations in the structure and other structural weaknesses. In another configuration, the inspection drone will have an ability, potentially with a robot arm, to pattern the surface of the spacecraft to add photogrammetry targets and DIC inspection pattern, as needed. In another configuration, the inspection drone will have the ability, potentially with a robot arm, to apply adhesive and fiber patches for simple repairs. After a repair, the inspection drone can pattern the new area, add photogrammetry pattern (if QR Code, core data like date of repair would be included), and reinspect the area as a new structural health monitoring baseline.

The inspection drone preferably has a suitable maneuvering system. Inspection drone maneuvering may be accomplished using pressurized gas with multiple engine nozzles to provide small vectoring thrusts, in any direction, on a continuous basis, to maneuver the inspection drone around the spacecraft maintaining proper working distance and orientation for the inspection process. The inspection drone may have a suitable gas reservoir or tank that may be recharged as needed (from a suitable recharging source, e.g., the docking craft). As resources reach low levels, the inspection drone will automatically return to its docking location to recharge its power and maneuvering gas, and supplies (e.g., such as tapes, fibers or materials for making repairs to the spacecraft being monitored and/or inspected).

Data collected by the inspection drones may be transmitted back to a central database computer on the spacecraft, for analysis analytics to historical data, and reporting. Reporting may include communication to maintenance personnel of inspection results and any concerns.

Photogrammetry targets on the spacecraft surface may be circular bar codes or other uniquely definable points, as discussed herein in connection with other embodiments. QR codes are the preferred photogrammetry targets because the QR code can also be seen as a DIC pattern for 3D surface measurements. The codes discussed herein may be used in conjunction with the inspection drone monitoring, including in space.

Photogrammetry may be performed by one camera imaging a static component, by imaging each surface area from at least three orthogonal positions, to provide a 3D analysis. Multiple photogrammetry targets provide location of the single camera in 3D space. Allowing it to measure the surface in 3D, aligning the DIC pattern for analysis.

Photogrammetry and DIC may be performed by a stereo pair of cameras for dynamic measurement of surfaces. The software may continually calibrate the stereo pair with known images and with calibration areas with fixed known pattern.

In still other alternate embodiments, an inspection drone is provided for inspection of objects in space, and may be coordinated with equipment resident on the spacecraft or object to be monitored so that the spacecraft or object being monitored may pattern itself, through its own robotic arm or patterning mechanism. According to some embodiments, the inspection drone may be tethered to a spacecraft or other object and may carry out operations while tethered, or may selectively release itself from a tether, and selectively return to its tether, including autonomous tethering operations.

According to some embodiments, the indicia pattern that is to be utilized for structural health monitoring may be pre-patterned, where the pattern is applied at a point during the manufacturing process, or prior to the manufacturing process. A pre-pattern sheet may be used. According to some embodiments, the method, system, and devices may implement pre-painting of a composite surface with a pattern that is applied onto the surface using a painted urethane sheet as a layer of the composite build. The urethane sheet is painted to have the desired attributes of a pattern (whether it is the pointillism type patterning, UV paint, a logo or indicia, or other random SHM pattern). The urethane sheet is then used to form a part with other sheets, such as where the urethan pre-pattern sheet is cured together with the other composite sheets. The part therefore begins with a pattern that may serve as a baseline. When the part is utilized in further construction steps for forming the part, and/or in the assembly process to apply the part to form a structure, the structural health monitoring may be carried out using the pattern applied by the urethane sheet (which is now part of the structure). The monitoring may take place during each step in which the part is present. This allows determinations of the impacts on structural strain, deformation, or other parameter being evaluated for the part, which may be a result of further steps in the construction process. Tolerances also may be monitored as well.

Comparison of measurements through time can show slight changes, like developing strains, damages, developing cracks, with magnitudes more sensitivity than human visual inspection. Data analytics, likely enhanced with machine learning, will allow the thousands (millions) of images and data from Optical SHM of entire structures, to be analyzed. Results can be quite complex, strains, such as manufacturing strains from internal structure, will not change over time and so can be ignored, but even very slight changes can indicate a developing problem, even internally. Early detection of problems can be scheduled in the next maintenance and lead to lower maintenance costs, better safety and performance, and life extension.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
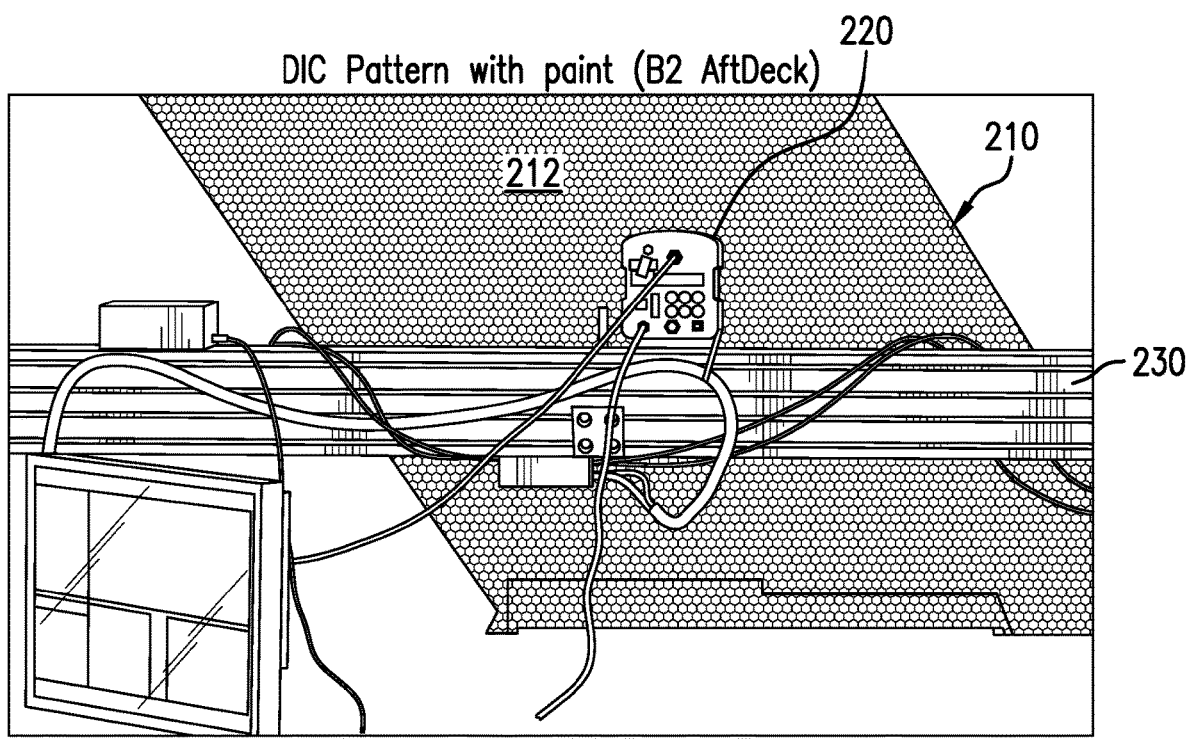
FIG. 1 is a side view of an aircraft panel that comprises the aft deck panel of a B2 aircraft.

Referring to FIG. 1, there is depicted a panel 210 of an aircraft. The panel 210 is an aft deck panel of a B2 aircraft, located at the rear of the aircraft, which comprises a metallic panel on the bomber's upper surface that shields its composite airframe from the heat of engine exhaust. The panel 210 therefore is susceptible to a variety of conditions, including, for example, strain as well as heat. The aft deck panel 210 is shown having a pattern 211 on its outer surface 212. In this exemplary embodiment, the pattern is comprised of indicia that are dots. The panel 210 in FIG. 1 shows a preferred example of a dot pattern that has been applied to the panel surface 212. The pattern may be applied using a suitable application means, some examples of which may include painting, printing, and the like. According to a an exemplary embodiment, the pattern may be applied with a paint or ink. Preferably, the painted on pattern must remain on the panel for the duration of the testing period. For example, the testing period may be the expected useful service life of the part, such as the aft panel of the aircraft in the example of FIG. 1, or could be shorter or longer (e.g., the maximum period of in-service use for the part being measured). The pattern may be reapplied as needed (where the prior pattern is removed so that the pattern may be reapplied).

Figure 6:
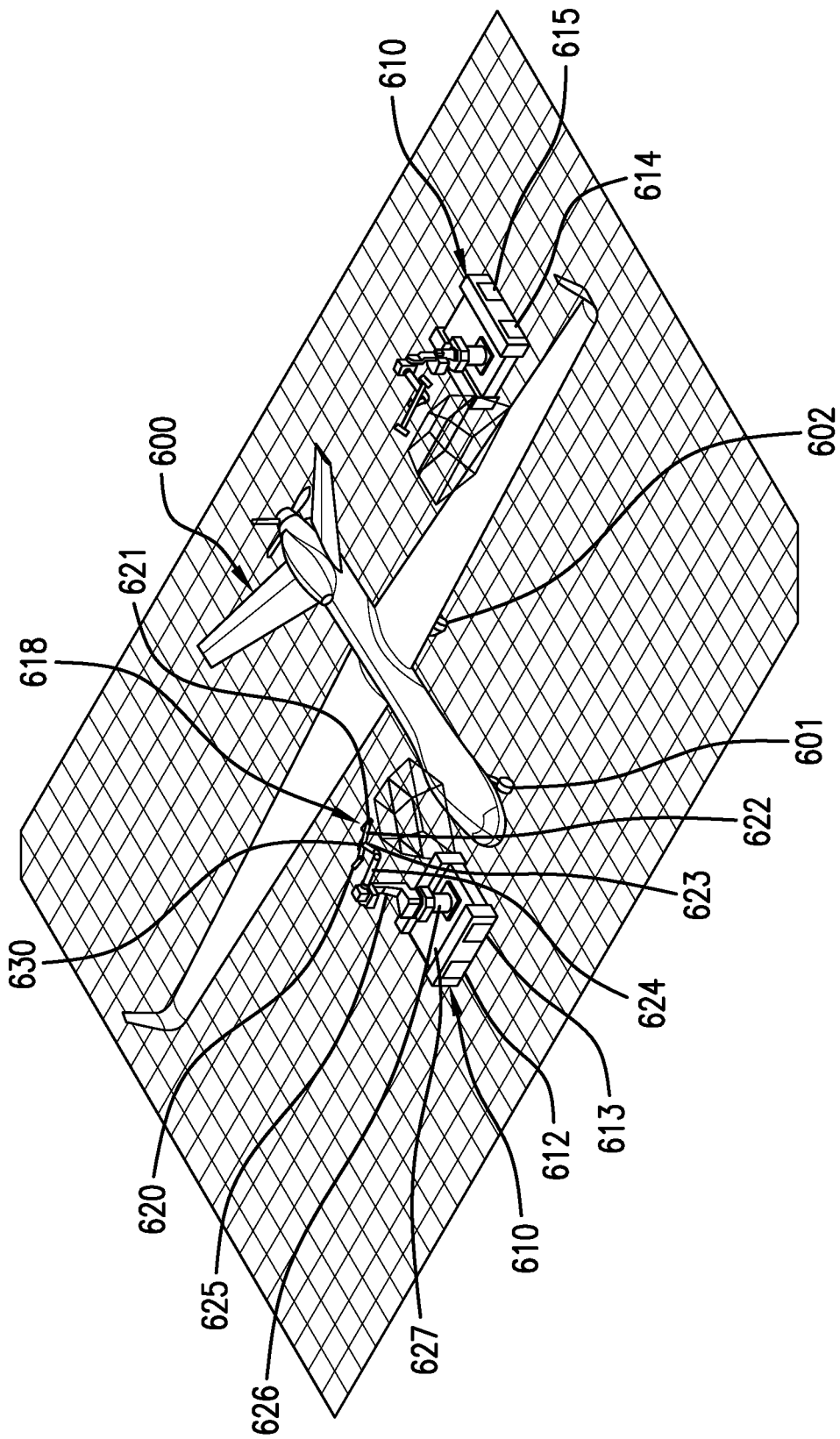
FIG. 6 is a perspective view showing an aircraft, and illustrating exemplary devices, comprising robots, for conducting the measurement of the aircraft surfaces (which have been patterned), and which the robots measure by imaging the surfaces.

In FIG. 1, a digital image sensor or camera 220 is shown positioned in front of the panel 210. The camera 210 is shown mounted on a frame 230. In the view depicted, the camera 220 may image the entire panel 210 in a single image, however, according to some alternate embodiments, the camera 220 may be mounted on a frame 230, and the frame 230 may be movable provided, or the camera 220 mounted for movement along the frame 230, or relative to the frame 230. According to some embodiments, the camera 220 may be mounted on a frame that has vertical and horizontal sections, along which the camera 220 may move to image the panel, such as the panel 210, from different locations. The camera 220 also may be mounted to tilt so that movement of the camera 220 along an x-y-z coordinate path and locations may take place. According to alternate embodiments, the camera 220 may be mounted or associated with a robot, as depicted in FIG. 6.

Figure 2:
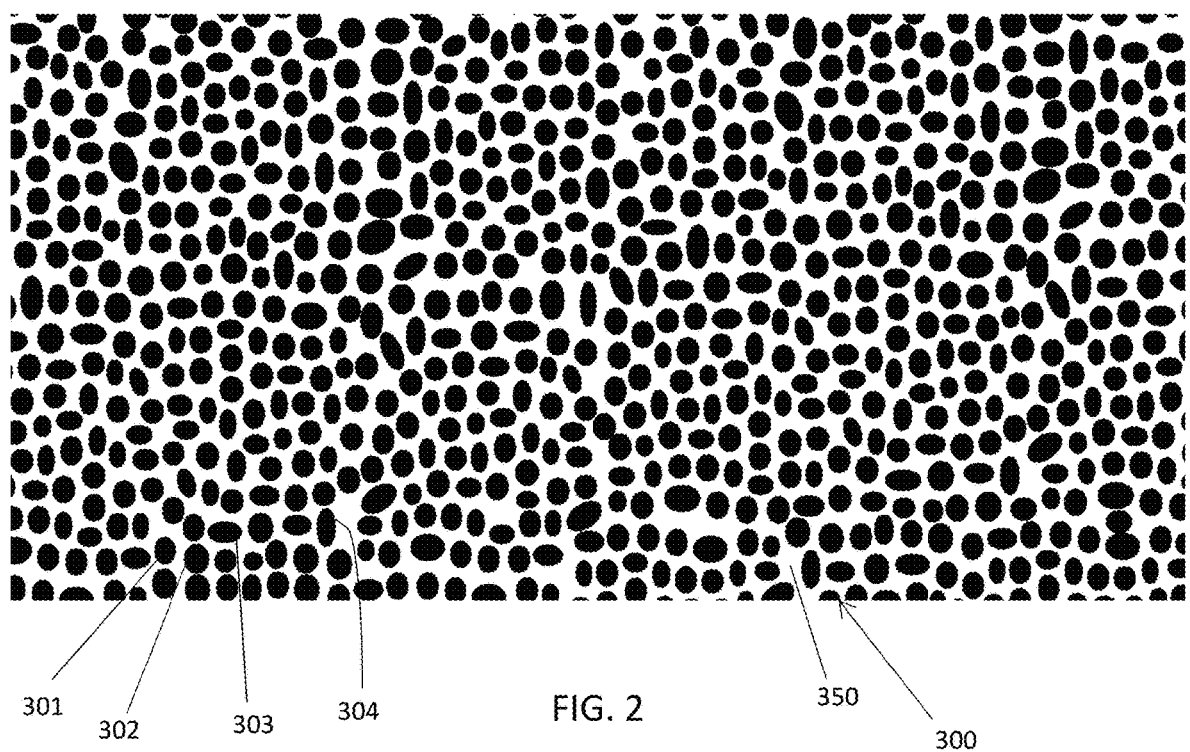
FIG. 2 is a plan view showing a random pattern of simular sized dots.

Referring to FIG. 2, there is illustrated an exemplary depiction of a DIC Pattern mask 310 shown comprising a random pattern 300 of simular sized dots 301, 302, 303, 304 . . . . , which are shown provided on a field or background 350. The dot pattern 300 may be used to produce a Vinyl (or simular) screen 310 having the random pattern of simular sized dots, such as the exemplary pattern illustrated in FIG. 2. According to a preferred embodiment, the dot pattern 300 may be provided on the vinyl screen or mask 310, where the background 350 may represent the vinyl screen material, and where the dots, such as those 301, 302, 303, 304 (and others . . . ), represent openings in the screen (or background 350) through which a coating medium, preferably a UV coating medium, such as a UV paint or UV ink, may be applied. The screen 310 preferably permits the dot pattern to be applied to the surface of a structure, such as, for example, the panel 210 shown in FIG. 1. According to some embodiments, the screen 310 may be placed on the panel surface, and the dot pattern, such as the pattern 300 may be applied to a surface of a structure using a suitable UV coating, such as a UV paint or ink, over the screen. The patterning disclosed herein in FIGS. 2 and 3, for example, may be carried out with vinyl (or other material) sheets cut with a vinyl cutting machine or using laser cutting to create a patterning mask as seen in FIG. 2 and demonstrated in FIG. 3, where a cut vinyl sheet, such as the mask 310 of FIG. 2, is placed on the surface, and then paint is applied over the sheet and through it, and the vinyl sheet is to show the pattern created.

Alternatively, the pattern, such as the random pattern 300, or other patterns and codes shown and described herein, may be applied using any suitable paint or coating application procedure, including manual application with a roller or squeegee or brush, or a robotic application using a robot (and one or more of the aforementioned applicators), or by printing it onto the panel surface with one or more printing heads that dispense the coating (e.g., paint or ink). For example, according to one implementation, the paint may be applied by positioning the panel or structure at a desired location to receive the patterning. The print head may be carried on a frame, such as, for example, a gantry that moves the print head relative to the surface to which the pattern is being applied.

According to embodiments of the invention, the system, method and devices may be used to apply patterns to existing structures, including structures that are already in use and have markings or decorations on them (such as logos or other markings that the item or structure may be required to display).

Figure 3:
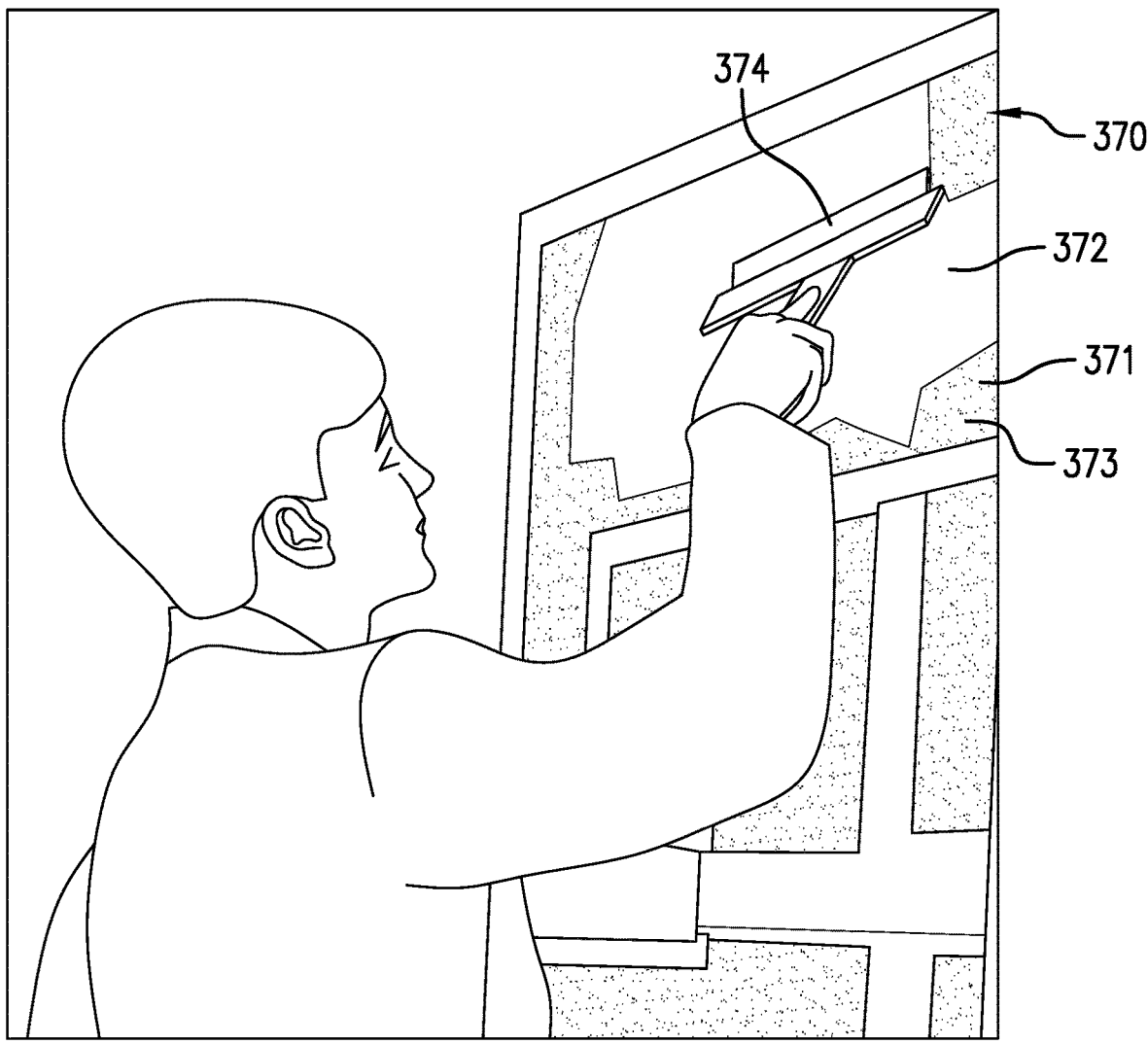
FIG. 3 is a perspective view of a Vulcan Spacecraft Panel, under test to failure, that is illustrated in connection with a pattern being applied to the panel, manually.

Referring to FIG. 3, there is illustrated a substrate 370 shown comprising a Vulcan Spacecraft Panel under test to failure. An application of a pattern 371 is applied to the panel surface. The depiction in FIG. 3 shows the manual application where a coating 372, such as a paint or ink, is applied over a screen 373. The screen may be the vinyl screen 310 shown and described in FIG. 2. The screen 373 has openings (see the plurality of dark dots or random indicia pattern) to produce the desired randomized dot pattern (or other desired shaped pattern) including with the codes (QR, numerical, and the like) that may be applied with the dot pattern. In the exemplary depiction, the screen 373 is positioned on the panel or substrate 370, and the person uses a roller 374 to spread the coating (e.g., a UV paint) over the surface of the screen 373, where the paint passes through the pattern 371, which comprises openings in the screen 373 that form the pattern 371. The paint preferably is UV paint that is not visible under normal lighting conditions under which the substrate, such as the panel, is used. Preferably, the users as well as those viewing the aircraft (in this example) will not identify the applied pattern. However, the pattern may be viewed and imaged under the imaging conditions where a suitable wavelength, such as a UV wavelength of light (or other light wavelength that is compatible with the coating used), is directed at the panel 370.

According to some embodiments, where the applied pattern is used for testing, and not in public use, the pattern may be applied to remain visible on the surface of the substrate.

The pattern may be imaged and stored prior to the testing, and may be associated with the CAD drawing of the imaged part, so that the pattern is mapped to x,y,z coordinates of the CAD. According to preferred embodiments, a UV fluorescent coating, such as a paint or ink, may be used for testing purposes, if desired.

Figure 4:
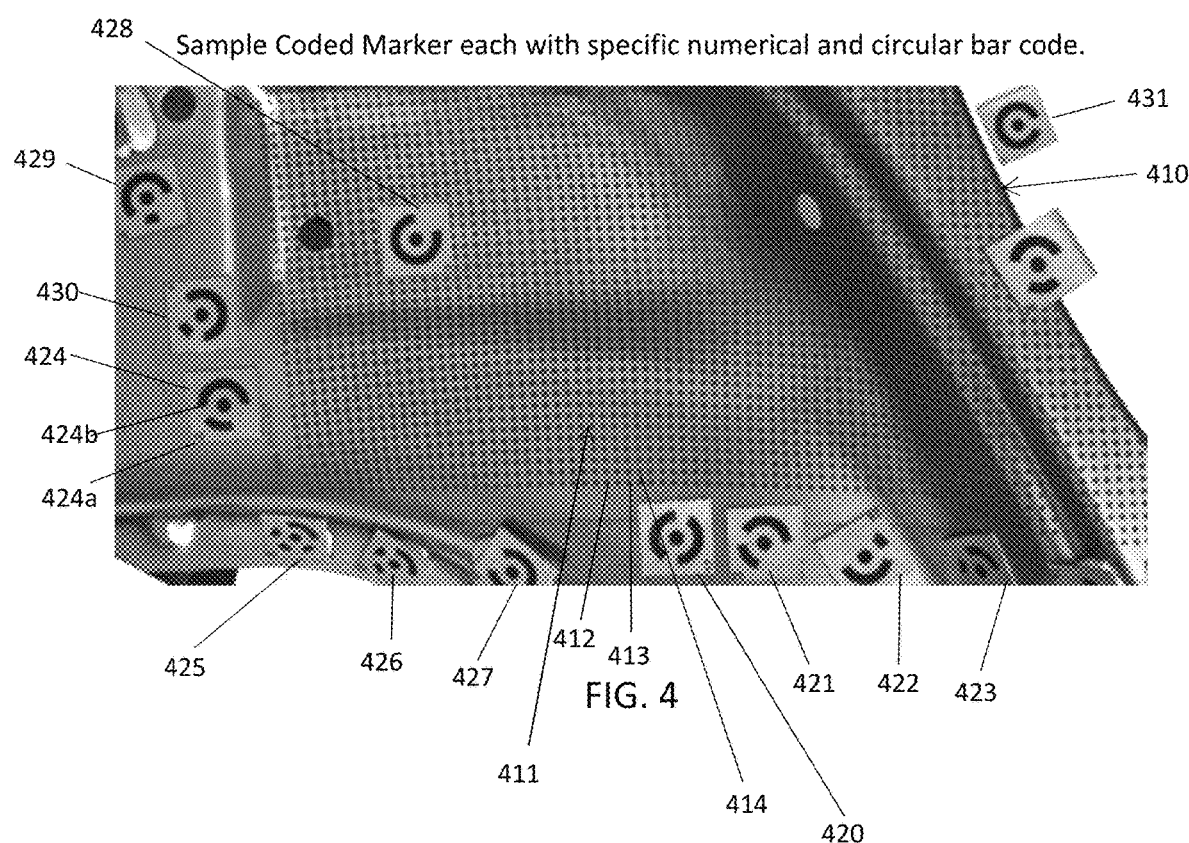
FIG. 4 is a plan view of a panel structure shown with an exemplary depiction of a dot pattern applied thereon along with exemplary depictions of coded markers (each marker in the exemplary depiction having a specific numerical and circular bar code).

Referring to FIG. 4, there is illustrated a panel 410 on which a pattern 411 of dots 412, 413, 414 . . . , has been applied, and also on which applied are a plurality of coded markers 420-431. In the illustration shown in FIG. 4, the coded markers 420-431 include a specific numerical code (see e.g., 424a) as well as a circular bar code (see e.g., 424b). The respective numerical codes and circular bar codes of the markers (such as those markers 420-431 shown in FIG. 4) may be used to represent particular information or data for the part, such as the panel 410, as well as to provide part of the patterning for the digital image correlation structural health analysis. The data may include information, such as, for example, part number, pattern number, serial number. Preferably, the patterning and the codes function as a strain gauge, where imaging of the surface of the part 410 shown in FIG. 4 may be carried out with an analysis of the pattern and its deformation to determine strain on the material.

According to preferred embodiments, the pattern as well as the code markers may be applied onto the structure with the use of paint or ink, and may, according to some preferred embodiments, be applied with a printer. The coating applied, such as ink or paint, preferably is a UV fluorescent paint that is not visible when viewed by a human in conventional lighting conditions (daylight, sunlight, or typical artificial lighting used in buildings). A UV light source preferably is used when the structural health analysis is carried out. The UV light source preferably includes one or more wavelengths that may be used to image the UV paint or ink. A camera having an image sensor that will record the UV applied pattern and codes captures the pattern and codes.

Figure 5:
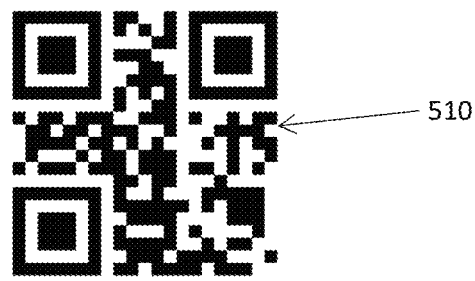
FIG. 5 is a front elevation view of an exemplary depiction of a two-dimensional (2D) code shown comprising a QR code.

Although codes are referred to, examples of codes may include circular bar codes with numeric references as are shown in FIG. 4, as well as a 2D codes, such as the QR code 510 shown in FIG. 5. The codes may be applied by printing onto the substrate surface, which according to some embodiments, may be applied along with the pattern or dots.

According to preferred embodiments, the codes that are applied to the surface, such as the invisible UV applied codes, may be security protected, so that anyone may not decipher the information. For example, the codes may reveal certain information about the structure or object on which they are placed (or reveal information of another, or associated, object). The security-specific coding preferably provides the capability for the UV pattern and codes to be applied on a structure, and be revealed with an appropriate light source, but protects the information against being revealed to anyone that would direct a UV light source to the structure to identify or capture the image.

Referring to FIG. 6, there is illustrated an exemplary implementation of the system, method and devices shown in conjunction with the structural health monitoring of an aircraft 600. The aircraft 600 is shown resting on its landing gear 601, 602 (with another portion of the landing gear, like 602 on the opposite side and being hidden from the view). A robotic imaging mechanism is shown comprising a pair of robots 610. Each robot 610 is configured with motors and wheels or treads (see e.g., the left wheels 612, 613, and right wheels 614, 615) for moving the robot 610 to locations around the aircraft 600 so that the aircraft surfaces may be imaged. In the illustration in FIG. 6, two robots 610 are shown, and there may be one or several robots used for an application, depending on the size of the surface and area to be covered, as well as the time frame for conducting the imaging and analysis. The robot 610 may include software or be in communication with a server or computer that includes software that includes the CAD image of the aircraft. The robot 610 may use the reference points of the aircraft 600, preferably the landing gear points, to determine the location of other structures of the aircraft 600, and the location of the pattern and codes being imaged. The pattern and code locations may be determined relative to the position determined by the robot capture of the aircraft landing gear. The landing gear 601, 602 may comprise a particular point of the landing gear from which the location reference measurements may be determined. According to some preferred embodiments, the landing gear 601, 602 provides the reference for current and future imaging, so that the imaged pattern of dots may be determined at time image t0, as well as at a subsequent monitored time t1. The digital image correlation (DIC) is applied to determine whether the pattern or some of the dots or even codes have shifted from their original position. The changes of the dot pattern on the structure at different imaging times is used to determine changes and the extent or changes to the structure.

As shown in FIG. 6, each robot 610 is provided having an imaging component 618, such as a camera, which images the aircraft surfaces. The camera is shown according to a preferred embodiment mounted on the robot 610 and comprising a pair of stereo cameras 620, 621 supported on a frame structure comprising a mount 622 and a first arm 623. In the exemplary illustration shown in FIG. 6, the first arm 623 connects with a second arm 624, which is mounted on a post 625 connecting to a mount or turret 626 that is supported on a base 627. The robot 610 also is provided with a power supply, such as, for example, a battery (e.g., rechargeable battery), or cabling that may follow the robot. Preferably, one or more of the robot base 627, mount 626, arms 623, 624, post 625 and mount 622, may house the power supply. According to other embodiments, a separate component may be provided to house the power supply. The imaging component 618 may include illumination means, such as a light source 630 that illuminates the aircraft 600 with the appropriate wavelength or wavelengths of light that will illuminate the UV pattern and codes on the aircraft 600 so that it may be captured by the camera (e.g., the stereo camera 610, 611). The robot 610 may be controlled by an operator, who may drive the robot 610 to one or more locations around the aircraft 600. According to some embodiments, a robot 610 may be programmed with instructions to carry out autonomous imaging of the aircraft 600. The robots 610 depicted in FIG. 6 use two or more points of the aircraft 600 to establish a reference location. Each robot 610 may have the same or different references location, as the reference location is relative to the physical location of the robot 610. In the example depicted, the robots 610 use the locations of the landing gear 610, 602 of the aircraft 600. Since the landing gear 601, 602 will always be in the same location, this allows the robot 610 to make imaging measurements and record the location of those measurements relative to the landing gear 601, 602. Accordingly, subsequent imaging by the robots 610 also may use the landing gear 601, 602, so that the imaged pattern and codes may be identified at a location relative to the landing gear 601, 602, which is the same relative location as the initial or previous image. The difference in movement of the pattern dots from a prior or initial position to a different position (e.g., caused by the deformity or elongation, or other change to the pattern), is representative of a stress, deformity, and may signify a potential damage condition. The changes of dots in the dot pattern and the pattern are determined to identify the location on the substrate of the structural condition.

Figure 7:
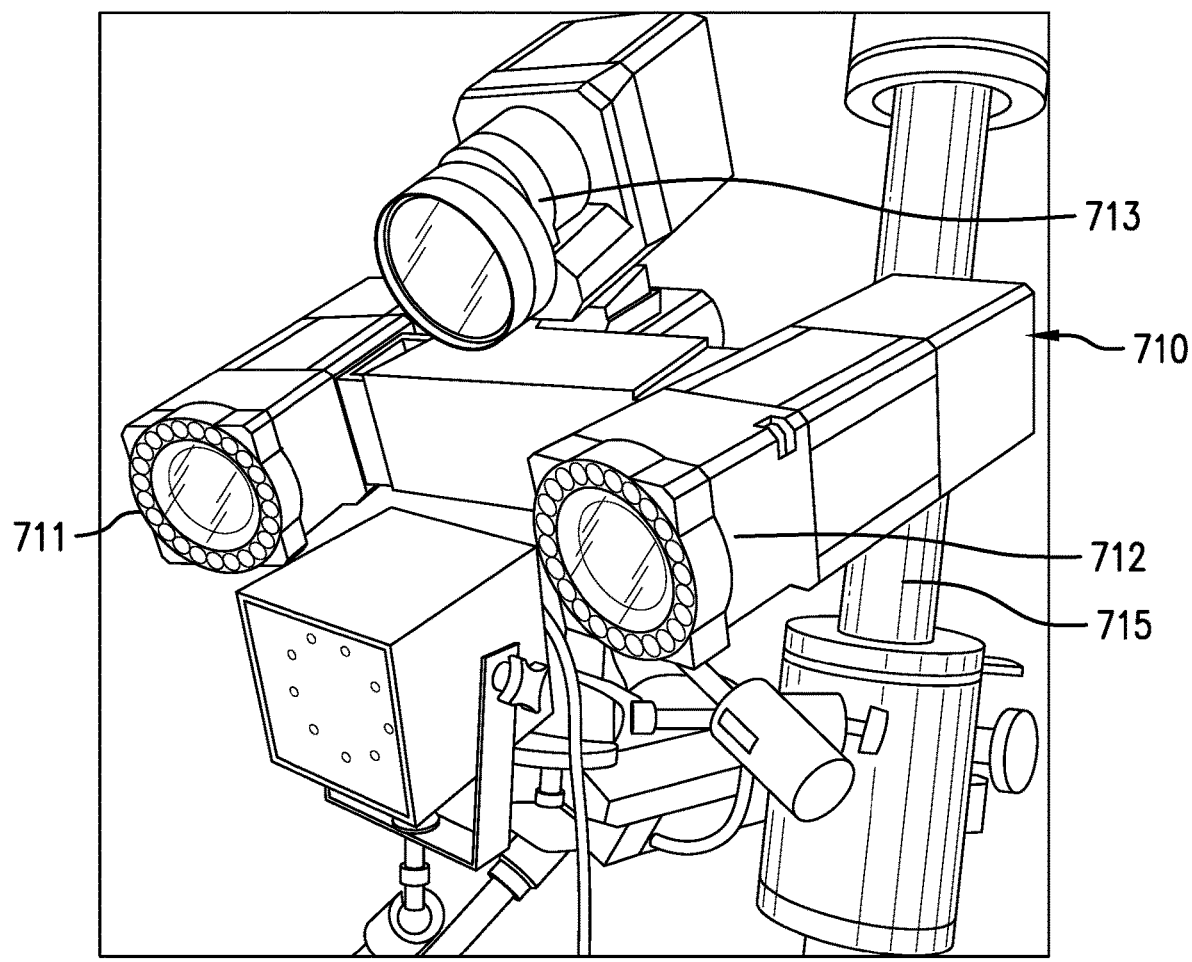
FIG. 7 is an exemplary embodiment of an imaging unit that may be used to carry out imaging (e.g., of the UV pattern and codes), the imaging unit shown comprising a UV ARAMIS Stereo 3D DIC with UV Illumination.

As shown in FIG. 7, an imaging unit 710, comprising a UV ARAMIS Stereo 3D DIC with UV Illumination, is shown. In accordance with embodiments, the ARAMIS Stereo 3D DIC may be provided as a unit that is installed on a robot, such as, for example, the robots 610 shown and described in connection with FIG. 6. Alternatively, the imaging unit 710 may be positioned at a location to image the substrate, for example, where a substrate panel is to be imaged, or a portion of a structure is imaged. According to some embodiments, the image capture of the subject substrate (e.g., an object being monitored), or portion thereof, may be imaged within a single field of view. According to other embodiments, a dual field of view for two or more cameras is used for image capture of the pattern and codes. Referring to FIG. 7, the imaging unit 710 is shown comprising a pair of stereo cameras, 711, 712 and an illumination source 713, which preferably may comprise a UV light source. In the exemplary depiction illustrated in FIG. 7, the imaging unit 710 is shown supported on a frame 715.

Figure 8:
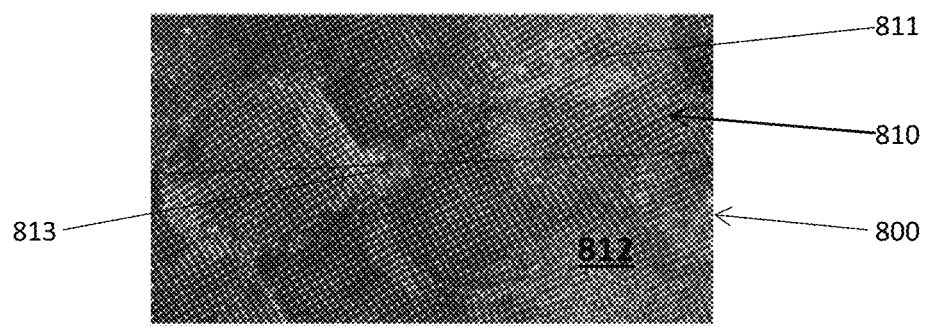
FIG. 8 is an exemplary depiction of a an image recorded of a structure, showing the capture of the image with ARAMIS employed to detect barely visible damage (BVD) under UV illumination.

Referring to FIG. 8, an exemplary depiction of an image 800 recorded of a structure is shown, showing the capture of the image 800 with an imaging unit, such as the ARAMIS unit 710 depicted in FIG. 7, employed to detect barely visible damage (BVD) under UV illumination. The image 800 may represent a screen of a computer, or printout. The image 800 shows a structure 810 with a dot pattern 811 on the surface 812. The imaging and the identification of a strain or other condition, represented by the center area 813 on the image that is red (or other color on the viewing screen or printout) to identify the area of potential condition, such as strain or defect. The structural health analysis preferably captures the image and pattern of dots 811 on the surface 812. However, where there is a detected variation (e.g., from a known prior position of the dots, e.g., from a prior imaging capture), the condition or defect may be identified and indicated in a report, visual depiction or other indicating mechanism.

Figure 9:
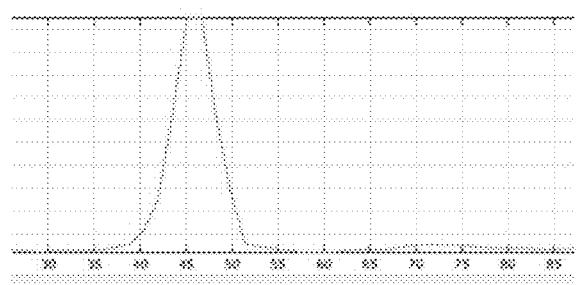
FIG. 9 illustrates a graph showing a plot of the strain corresponding to the image of FIG. 8.

FIG. 9 illustrates a graph showing a plot of the strain corresponding to the image of FIG. 8, and identifies a peak indicating a strain condition has been detected. FIG. 9 is another way to identify and or represent the detection and determination of a condition that may be detected using structural health monitoring, in accordance with the system, method and devices herein.

According to some preferred embodiments methods, systems and devices are provided for conducting optical structural health monitoring that uses both a 3D imaging system with imaging components (cameras, light source), such as ARAMIS (see e.g., FIG. 7) and non destructive thermography (Thermography NDT), calibrated together, and according to preferred embodiments, coupled with the RVAT database, for life long condition monitoring. As discussed herein, the RVAT database contains the information for the as-built structure being monitored, and preferably includes the CAD coordinates as well as the actual structure (as-built), which may be different than the CAD for the design of the structure. ARAMIS 3D DIC (digital image correlation) is implemented to detect delamination prior to when Thermography NDT sees any delamination. However, the present system, methods and devices provide DIC and thermography in order to make determinations about the structural health. For example, the digital imaging system, such as the ARAMIS 3D DIC (which comprises software and imaging components that capture and map in coordinates the object being monitored), as well as the NDT thermography together they tell the whole story of the part or structure being monitored. The thermography also may be carried out using the ARAMIS system with a thermal imaging source (e.g., infra-red) and capture source (camera or cameras), to obtain the thermal imaging information (see e.g., FIG. 7). According to preferred embodiments, ARAMIS provides the 3D perspective to CAD to the Thermography, so that defects may be precisely located, not currently possible. The combined results show, deformation (dents), strain (material stressing), and delaminations (laminar failure), all in 3D coordinates (known location on vehicle and which specific structure). The RVAT database may be updated each time structural health monitoring is conducted for an object (or substrate). The historical information, from the RVAT database, of previous inspections for each point, provides hugely greater sensitivity to early detection of defects. Another benefit obtained with the present method, system and devices is the elimination or minimization of not false positives from existing structure. ARAMIS and Thermography also validate each other's measurements for critical defects. In addition, the validation verses FEA is highly powerful for the ARAMIS Thermography result determination of defect effectivity.

Figure 11:
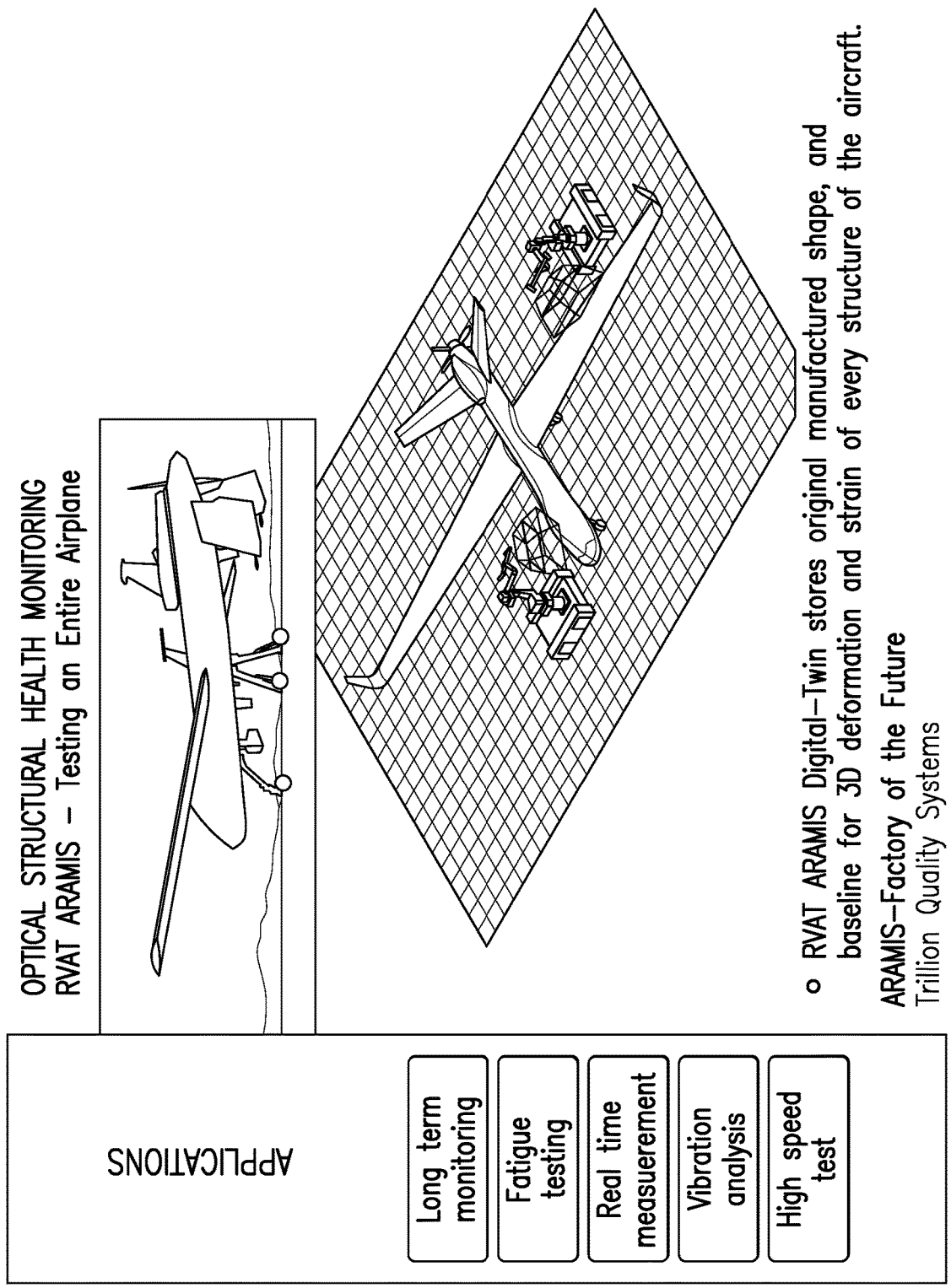
FIG. 11 is an illustration of an aircraft.
Figure 12:
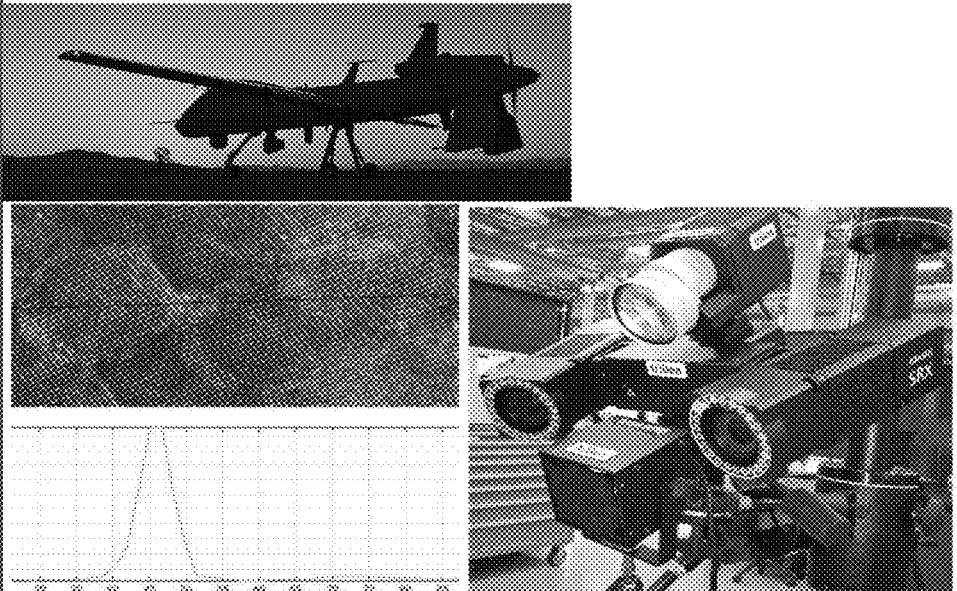
FIG. 12 is an illustration showing the detection of a defect using measurements to detect slight changes over time of shape, 3D deformation and strain of a structure.
Figure 13:
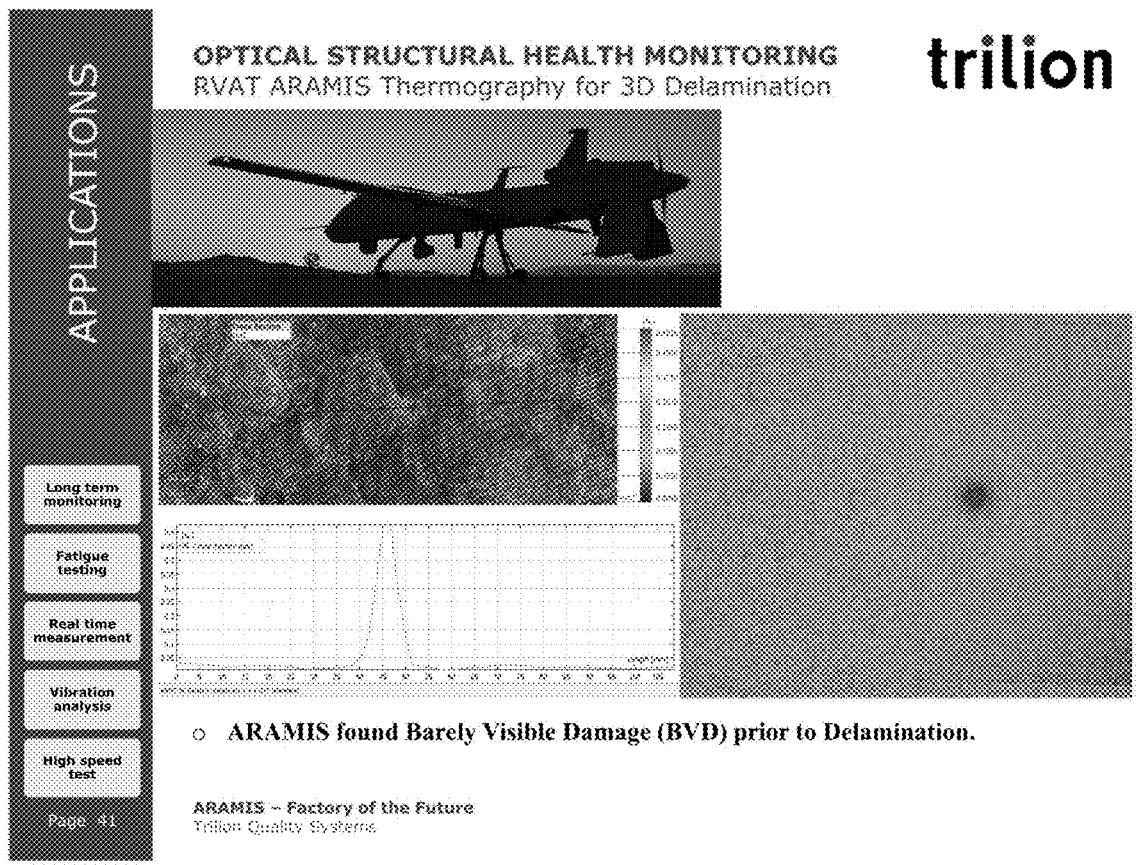
FIG. 13 is an example of detection of barely visible damage prior to delamination.
Figure 14:
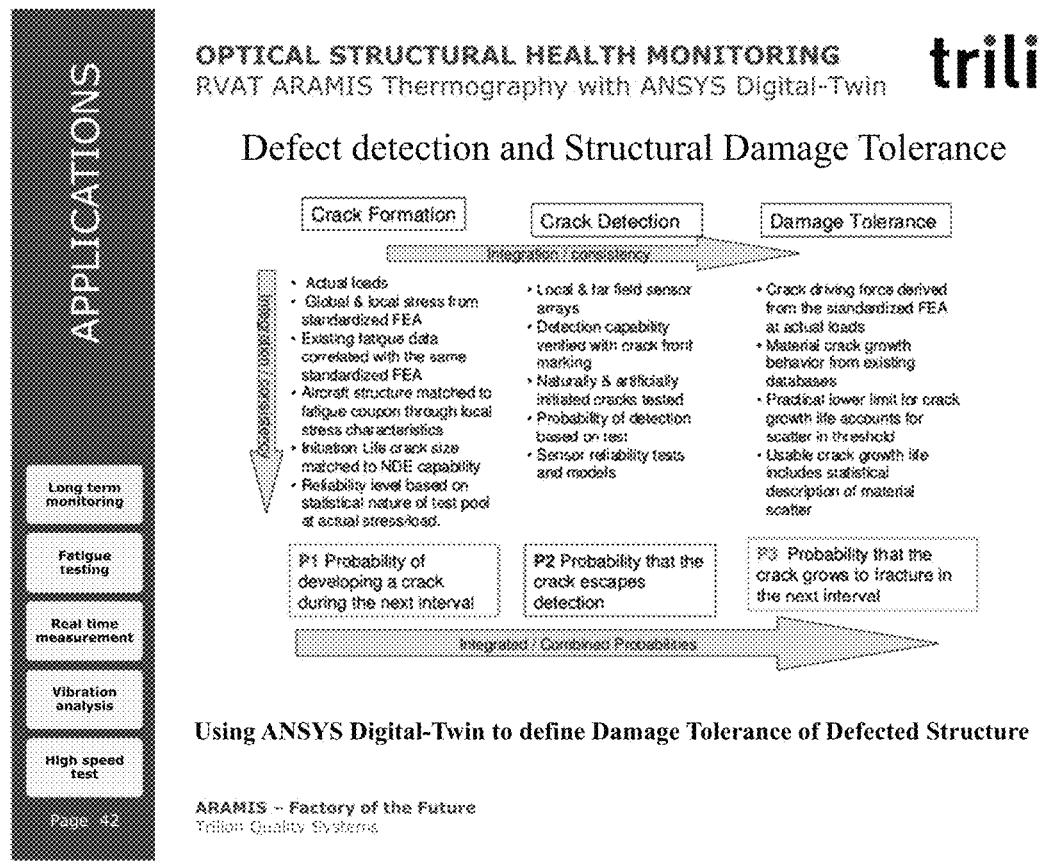
FIG. 14 is schematic diagram depicting damage tolerance of a defected structure.
Figure 15:
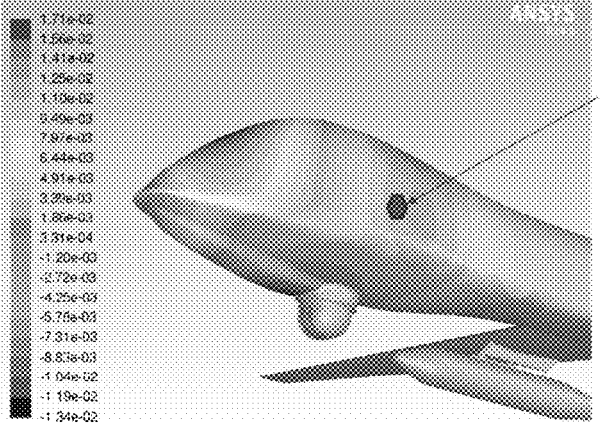
FIG. 15 is an illustration of an image of an aircraft illustrating the use of the Digital-Twin to define damage tolerances, showing detection of a defect.
Figure 16:
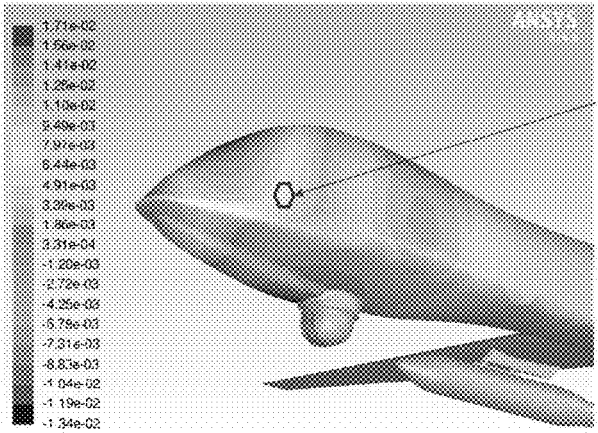
FIG. 16 is an illustration of an image of an aircraft illustrating the use of the Digital-Twin to define damage tolerances, showing detection of a critical defect.

Referring to FIGS. 11-16, there is illustrated in FIG. 11, the illustration of the aircraft 600 shown in FIG. 6. The RVAT ARAMIS Digital-Twin stores the original manufactured shape, and provides the baseline for 3D deformation and strain for every structure of the aircraft. Referring to FIG. 12, the RVAT ARAMIS Digital-Twin measurements may detect slight changes over time of shape, 3D deformation and strain for an object, such as the aircraft depicted. As shown in FIG. 13, the implementation of the system, method and devices illustrates detection of barely visible damage (BVD) to a structure, which may be detected prior to delamination. The damage is indicated and its location on the structure identified. Referring to FIG. 14, defect detection and structural damage tolerance are depicted. The system may be used to follow and predict potential outcomes for structures, and through the detection of the damage may also qualify or quantify the damage and extent of damage, so that determinations may be made for potential remedial action (repair, replacement, further testing, etc.). This is illustrated in FIG. 14, where limits and thresholds may be established from the use of the Digital-Twin (ANSYS Digital-Twin) to define the damage tolerance of a structure. Referring to FIGS. 15 and 16, in each image, a detected defect is illustrated in an aircraft. The ANSYS Digital-Twin is applied with the ARAMIS 3D DIC and Thermography NDT to obtain the information that reveals detection of a defect in the aircraft. The defect is located in the Digital-Twin, an represents a low damage indication (FIG. 15). In this instance, the information indicates that the defect may be addressed at the next scheduled maintenance stop for the aircraft. The determination of the defect threshold may determine whether the defect needs to be addressed, for example where the defect is located in the wing structure, or other critical location, such as for example, the defect detected in FIG. 16.

Preferred embodiments of the system, method and devices, use an invisible pattern to measure with an optical measurement method. An imaging component, such as a camera, preferably is used in conjunction with a light source that provides a suitable wavelength of light output that may be delivered to the substrate or surface being measured. The optical measurement method may be a method that obtains and stores pattern location at a particular point in time, and images to obtain and store the pattern location at a subsequent point in time, such as after activity or stress loading has taken place. The imaging information, including the pattern locations of the indicia forming the pattern are correlated to determine whether changes have taken place, and where those changes have occurred, and the extent of the changes and directions. The information may be used to determine strain and whether the part or article is suitable for continued service, or whether repairs or replacements are necessary. A UV paint or ink is used to apply the dot pattern to the structure surface, so that the dot pattern may be measured on the structure surface. A database is constructed and stores the historical results of the imaged structure and pattern thereon (as well as codes), and preferably stores each imaged measurement of the pattern, so that the database contains historical results that measure slight changes for structural health monitoring. The stored imaging is coupled with analytics, and preferably software containing instructions for comparing the images is provided. A computer may be used to store the images, as well as process the images to compare historical results of the pattern changes, and identify changes in the structure.

According to preferred embodiments, the imaged structure is compared with the CAD of the structure for determining the location of the pattern and codes located on the structure. The comparison may be made of the original or prior pattern image which may be an image of the pattern that includes the CAD coordinates, or has been applied to the CAD. The CAD of the structure preferably is generated to include the image dot pattern and codes as part of the CAD, wherein a CAD-correlated related image and file (CAD-CM) are generated. The imaged structure may be monitored for structural health by imaging the structure and pattern thereon and comparing it with the prior CAD (that includes the prior imaged pattern). The creation of the CAD-coordinated related image and file is generated from the UV pattern of dots and codes captured with an imaging device, such as a camera (or cameras), and a UV light source. The CAD-CM is stored and preferably is included within a database to provide historical accounts of the structure being monitored (e.g., such as an aircraft).

The imaged structure also may be used for comparison in a finite element analysis (FEA), for understanding local 3D displacement and strain requirements and limits. For example, where strain limits or requirements are identified, the comparison of the imaged pattern and changes that may be identified during subsequent health monitoring of the structure and pattern.

According to some embodiments, the system is configured with instructions for implementing machine learning that learns human analysis of historical results. The machine learning may track the human analysis, such as the human's coordination between images, including for example, when determinations based on the image correlations are inspected by humans. The machine may store the types of data point relationships that the human has determined to represent a condition of interest. The machine then may automatically, without the further human input, on subsequent imaging evaluations analyze and correlate the images (a prior image and a current or subsequent image), for the deviation or pattern change determined to be of interest (based on the prior human activities, but which the machine has learned). Therefore the machine, such as a computer with software containing instructions for carrying out the evaluation of the image data and the ability to change the software to include reporting and detection of comparisons that have been learned, may provide an output or report of the structural health of the object (including pointing to one or more areas of potential deviations or damage indications).

The system also may obtain and store image patterns and may provide a spatial alignment of an image with one or more historical images. The spatial alignment preferably may be carried out using targets, such as coded targets. For example, coded targets may comprise a QR code or other 2 dimensional code, such as the codes shown and described herein, which may be applied as part of or along with the pattern. The coded targets may be aligned to provide a spatial alignment of historical images. The pattern may be observed in connection with one or more prior patterns. The code may include a QR code, which provides information as to the position of the imaged part, and the code also may provide information about the part itself. For example, a scan of an imaged structure may identify the structure based on the QR code scan. The system then may immediately proceed to call up the information for the structure from a library and/or database for the structure, and identify the particular structure.

The imaging may take place using one or more robots (such as, for example, as shown and described in connection with FIG. 6), to provide digital image correlation (DIC). The robot positioning for the imaging preferably may rely on a portion of the structure that remains in the same location (reference structure), so that the other portions of the structure may be imaged and their locations determined relative to the reference structure portion. The robot may move and identify its position based on its present location relative to the reference structure. The movement of the robot enables imaging of a pattern that has been applied to a large structure, such as for example, an aircraft. Although the robot will capture separate points of view for the same structure, the dot pattern and code locations are identified based on the robot's referential determined location. The CAD coordinates also may be used and a file created that contains the imaged patterns that the robot has captured using an imaging unit (e.g., camera and light source), to image the UV applied pattern of the structure.

According to some embodiments, the patterning and coding may be used to align the robot. For example, codes may contain information that identifies a particular location of the structure. The robot may be programmed to search for a particular code, or alternatively, when the robot imaging unit encounters a particular code, the code is recognized, and the robot is aligned to image the structure or portion of the structure. In addition, the codes may be used to designate one or more structural portions of interest, or that may be imaged at different time intervals. In this manner, for example, the robot may carry out imaging by imaging the structure, and image in accordance with a set of instructions that direct the robot to image one or more particular portions of the structure. For example, if the robot is to image the vertical stabilizer of an aircraft, the robot may image and scan the aircraft until it identifies a QR code that indicates that it is in the location of the vertical stabilizer. The robot may image one or more other QR codes, as directed, if needed, to identify the location of the aircraft (the stabilizer location) to be imaged.

According to some embodiments, the system, method and devices may include a Sample Coded Marker, each with specific numerical and circular bar code. Some examples of markers are shown in FIG. 4, such as the markers 420-431). The marker may be applied on the structure through painting.

Figure 10:
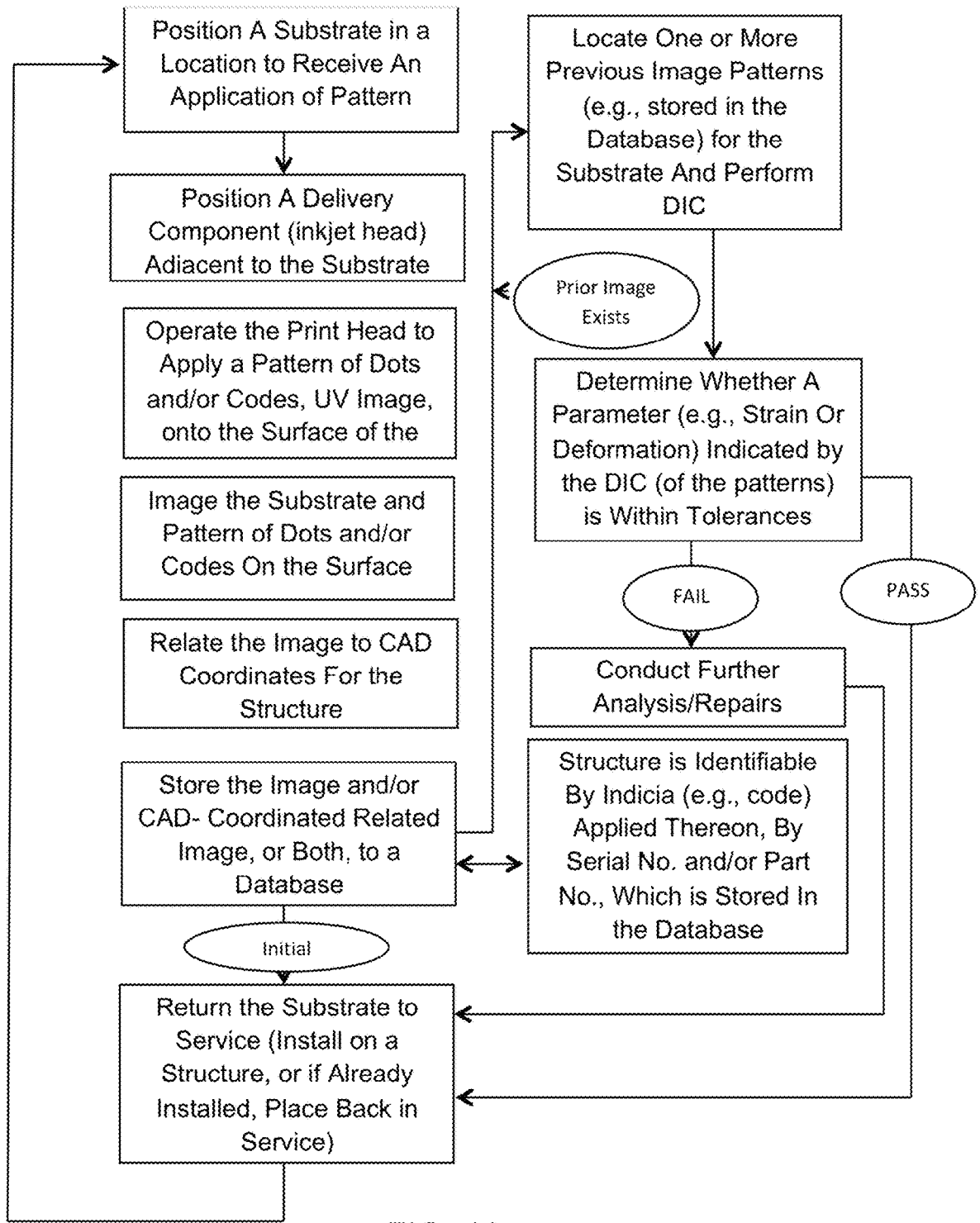
FIG. 10 is a flow diagram illustrating an exemplary depiction of the system and method for monitoring the structural health of an object.

Referring to FIG. 10, a flow diagram is illustrated, setting forth steps of an exemplary embodiment of structural health monitoring carried out in accordance with an embodiment of the invention. The systems, such as those shown and described herein may be used to carry out the method. The method depicted involves conducting structure health monitoring by evaluating a substrate for strain and/or deformation. The substrate is positioned at a location, which may be a table, frame or other support (e.g., fixture during assembly or manufacturing). A mechanism to apply a pattern and/or codes with a UV coating (such as ink or paint) depicted comprising a print head is positioned adjacent to the substrate. The print head may be operated to deliver the pattern with a series of on and off applications from the print head nozzle or nozzles (or other applicator). The operation of the print head also may include moving the print head along vertical, horizontal, or angled axes (e.g., x-y-z axis), to deliver a pattern of dots and apply codes on the surface of the substrate. Once the pattern is applied using the UV paint or ink, the substrate is imaged, capturing the pattern and codes. Preferred embodiments, as represented in the flow diagram of FIG. 10, preferably image the pattern and coordinate the pattern with the CAD image file for the substrate being imaged (or portion of the substrate being imaged—where a pattern is applied to a portion of the substrate). Preferably, the CAD-coordinated related image (e.g., CAD-CRI, with the pattern represented in the CAD coordinates), as well as the CAD images in some embodiments, are stored in the database. If the method is an initial patterning of the substrate, upon completion of the patterning and storage of the image, the substrate may be returned to service. (According to some alternate embodiments, the substrate may undergo further testing, or assembly, as the system may be used to pattern an image during assembly, and then conduct the structural health monitoring over an assembly operation.)

Referring to FIG. 10, the structure is identified by indicia, which preferably corresponds with information stored in a database. The method is depicted continuing where one or more prior images are located for the substrate, and DIC is carried out, and a determination made to ascertain whether the strain or deformation or other condition detected is within tolerances. If it passes, then the next action may proceed, which, in the exemplary depiction is a return of the structure to service. However, if the structure should fail the analysis, further analysis is conducted, and/or repairs may be made, or the structure is taken out of service.

According to some embodiments, the CAD-CRI preferably may be stored and generated to include the CAD coordinates for the structure, and may include baseline and historical CAD coordinates for the structure. The database preferably may include the historical CAD information, as well as include the information for conducting structural health monitoring of the structure or object and the record of changes over time (which may be changes or occurrences of conditions, such as strain or deformations, or movements of the object or portions thereof). The dot patterns and codes may be stored in the database, as part of the CAD-CM image and file. The dot pattern and codes also may be stored and maintained so that images may be generated to graphically represent the changes to an operator. According to some implementations, the CAD and CRI may be spatially synchronized, for example, through a QR code.

The database also identifies corresponding part information, part. number, serial number, model number, dates, which may be associated in the database with one or more of the codes that are printed on the substrate. Therefore, when the image of the substrate is captured with a UV imaging source (e.g., camera with a UV image sensor and UV light source), the UV applied codes are also captured and the system, which preferably includes a computer with a hardware processor, memory, and storage means, identifies the code and uses the code to identify the substrate (structure or part) based on the information within the database. The imaging of the structure also may be stored, so that each image of the structure, and its pattern and codes are stored for each time, and may provide a structural health history for the part being evaluated. In the case where the substrate is undergoing an initial pattern imaging, the substrate is returned to or placed into service, once the imaging information has been obtained. In the case, however, where a prior imaging capture of the pattern and codes has taken place, a structural health analysis may be conducted. The present image is stored, preferably as a CAD-coordinated related image (CAD-CRI). A prior image of the substrate (e.g., the part being evaluated) is located within the database. This may be accomplished using the UV code detected for the part being imaged for analysis, and matching that code to a reference in the database. The system, preferably using a computer (e.g., server), identifies the code and uses the code to match the code to a corresponding part. The part therefore has associated with it the structural health history, which preferably includes prior image scans. DIC is performed for the image obtained, based on a baseline image (which may be one or more previously obtained images preferably stored in the database). According to preferred embodiments, the images are stored in a CAD coordinated related form. The DIC may be carried out with the CAD images showing the changes as well as identifications between coordinates that show threshold structural strain, deformation, or other parameter being evaluated. The method also may include determining, from the DIC, whether a parameter is within an acceptable tolerance or whether it is out of range. For example, as depicted, where the tolerance is met, the substrate, such as a structure (panel, assembly, aircraft, or vehicle) may be returned to service (or installed back onto the assembly from which it was detached). In the case of a failure to meet tolerances, further analysis and testing is conducted, and possible repairs are indicated or performed. The system and method also may be used during an assembly to determine whether the structure meets the threshold parameters or tolerances to the placed into service or used, and may be continued to be monitored through subsequent imaging of the patterns and codes.

CAD-CM can be spatial synchronized with the FEA (Finite Element Model) which models the operational stresses (forces) and strains (material response). With the FEA data, defects detected can be defined by their effectivity to the operational structure. Typically, defects found will drive repair if a certain size, independent of the loading of that structure, based on material criteria and worst loads. But with local FEA analysis, a defect can be defined as immediately repairable if in a high stress area, or programmed for future maintenance if not in a high stress area. This allows for advanced programmed maintenance, focused preventative maintenance and life extension.

Embodiments of the invention may implement structural health monitoring using digital image correlation with the implementation of an inspection drone. An inspection drone may be powered by a suitable power source and equipped with imaging apparatus to image, record, store and/or transmit information obtained from an image of a structure, such as an airport runway, bridge, roadway or other structure. According to implementations, the inspection drone may be used to carry out structures that are supported on the earth's surface (bridge or building), the ocean or water body floor (e.g., oil rig), or on a water surface. The inspection drone also may be carried out in conjunction with one or more of the structural health monitoring embodiments disclosed herein. In addition, patterning the structure, with UV paint, a pattern of a design, or other pattern, may be applied using a suitable patterning method. According to some embodiments, a pre-patterned film may be applied to the structure, and the structure patterning may be monitored over time to determine whether changes have taken place.

Figure 17:
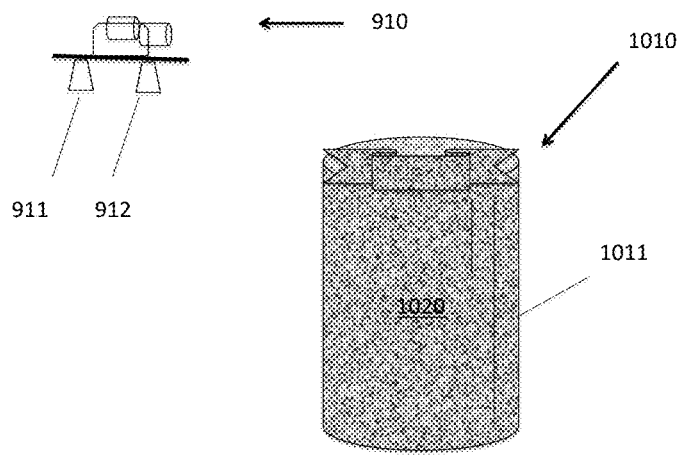
FIG. 17 is a perspective view of a schematic arrangement of an inspection drone configured with inspection equipment shown in connection with a spacecraft.
Figure 18:
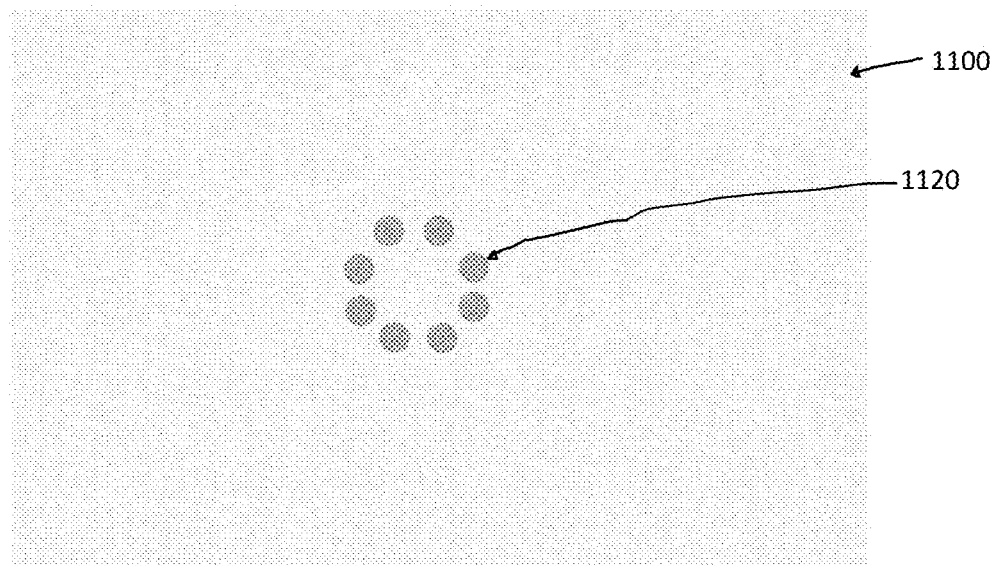
FIG. 18 is an exemplary representation of a surface with a logo, such as a company mark or logo that would be painted on an aircraft.
Figure 19:
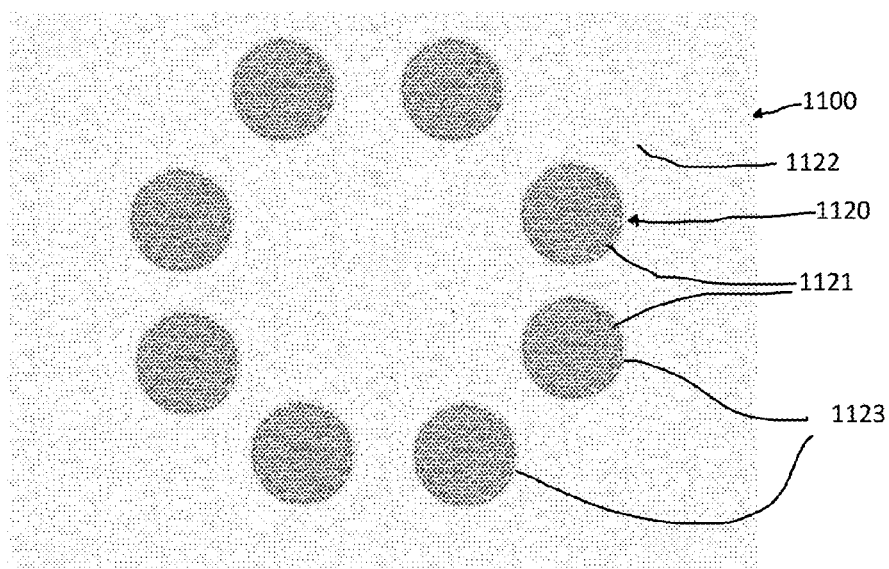
FIG. 19 is an exemplary depiction of the surface and logo illustrated in FIG. 18, but shown depicted by Seurat pointillism patterning.

Embodiments of the method and system also may be implemented with an inspection drone, such as the inspection drone 910 represented in the schematic illustration shown in FIG. 17. In the depiction represented in FIG. 17, the inspection drone is configured for use in space, and comprises a space inspection drone for conducting structural health monitoring of a spacecraft. The inspection drone 910 is depicted with a spacecraft 1010, which may be any of the aforementioned spacecrafts, such as for example, an inflatable space habitat. The inspection drone 910 preferably includes communications equipment for communicating with one or more of an earth station, the object being inspected, or other means for sending and receiving communications. The inspection drone may carry on it one or more cameras that capture, store and relay images to the operator. The inspection drone 910 may include circuitry, one or more computers, microprocessors, or microcontrollers, as well as a power supply or source of power generation. Software for directing the inspection drone operations, as well as the inspections and monitoring may be provided in the circuitry and components of the drone 910. The inspection drone 910 preferably includes a mechanism for maneuvering the drone 910. In the exemplary illustration depicted, gas jetting nozzles 911, 912 are shown to represent one type of mechanism for maneuvering and movement of the drone 910. The gas jetting nozzles 911, 912 are shown as two in number, but a single or plurality of nozzles may be provided. The nozzles 911, 912, preferably are controllable to tilt or move in a desired direction so that thrust may be applied directionally to control the movement of the drone 910. For example, the inspection drone 910 may carry a pressurized tank containing a suitable gas, which is connected to a valve that may be operated through the drone circuitry to control the release of the gas (as well as the nozzle direction) through the propelling nozzle, such as the nozzle or nozzles 911, 912. The nozzles 911, 912 preferably are connected to the valve though a suitable conduit. The inspection drone 910 may be powered and maneuvered using any suitable commercially available space control system, if desired. The inspection drone preferably carries a thermal imaging camera, as well as a thermal imaging source, e.g., such as an infrared light source. According to some embodiments, the inspection drone is configured with a device to deliver a pulse of light and the capability to carry out pulsed-thermal thermography by implementing non-contact NDT of the spacecraft surface 1011 as needed. The spacecraft 1010 is shown having a pattern 1020 on its surface 1011. According to some embodiments, the pattern 1020 may comprise photogrammetry dots, or other pattern. According to some embodiments, the pattern may already be existing on the spacecraft surface, while according to some other embodiments, an inspection drone, such as the exemplary drone 910, may be equipped with a mechanism that applies a pattern to the spacecraft surface 1011. This may include one or more patterning delivery nozzles having a pressurized stream that delivers atomized ink or paint to the spacecraft surface 1011. Once the pattern has been applied, the inspection drone 911 may make an initial image of the pattern to serve as a baseline for future images. According to some alternate embodiments, the spacecraft surface 1011 is provided with a pattern prior to it launch or installation.

In addition to, or as part of the pattern, the spacecraft surface preferably include one or more markers for aligning the spacecraft 1010 with previous inspection results. For example, the spacecraft 1010 may be provided with photogrammetry dots or other locators (e.g., QR codes, or other coded markers) on its surface 1011 for locating the camera carried by the inspection drone 910, in space. The photogrammetry codes or patterns also provide points for measurement of 3D coordinates. The inspection drone 910 preferably includes a camera system 920, represented schematically in FIG. 17, which may be the same camera system discussed herein in connection with the other embodiments for carrying out DIC, where the inspection drone 910 carried out DIC on the spacecraft 1010. Preferably, the inspection drone 910 carried out DIC on the spacecraft 1010 in space, using an applied pattern on the surface 1011 of the spacecraft 1010 to measure its 3D shape, deformation and surface strain, imaging the entire surface of the spacecraft 1010. The photogrammetry targets are used to locate the DIC image on the spacecraft surface 1011, aligning it with previous results. The inspection drone 910 is maneuvered to cover the entire spacecraft 1011, or a desired portion of interest.

The inspection drone 910 may utilize the methods shown and described herein in connection with inspection of other objects to conduct and provide optical structural health monitoring of objects in space, such as for example spacecrafts. Inspection drones according to the invention, such as the inspection drone 910 schematically represented in FIG. 17, may be configured with the imaging system and components depicted in FIG. 7, such as a thermal light or pulsed source (which may deliver infrared or other suitable wavelength light or heat), two image capturing units (or cameras).

FIGS. 18-21 show an exemplary representation of a surface 1100 with indicia 1120 applied thereon. The indicia 1120 is shown applied to the surface 1100, and according to an exemplary embodiment comprises a design 1121 and a field or background 1122. The surface 1100 may be a surface of an article or substrate that is to be monitored for structural health, in accordance with the embodiments and implementations shown and described herein. For example, according to a preferred implementation, the surface 1100 may comprise a surface of an aircraft panel.

Referring to FIGS. 18-21, the image of the design 1121 is shown formed by a circular arrangement of circles 1123. The circles themselves 1123 are formed by a smaller shapes 1124, which may comprises dots, points or other small shapes. The smaller shapes 1124 forming the circles 1123 preferably are arranged in a random pattern, as discussed with patterning embodiments herein. The pattern provides an aesthetic design, and also serves to provide a baseline comprising a strain pattern from which strain measurements may be made. The patterning may be pointillism, such as the type of visual effect that was used by the French artist Georges Seurat.

Figure 20:
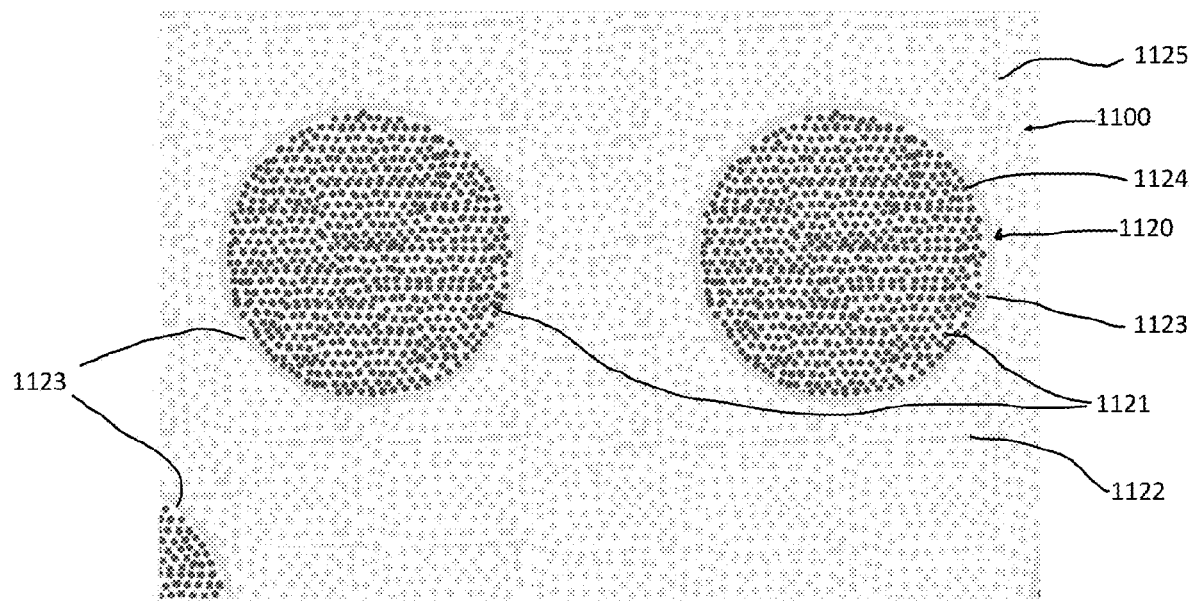
FIG. 20 is an enlarged partial view of the depiction of the surface of FIG. 19 zoomed in to show the individual dots.
Figure 21:
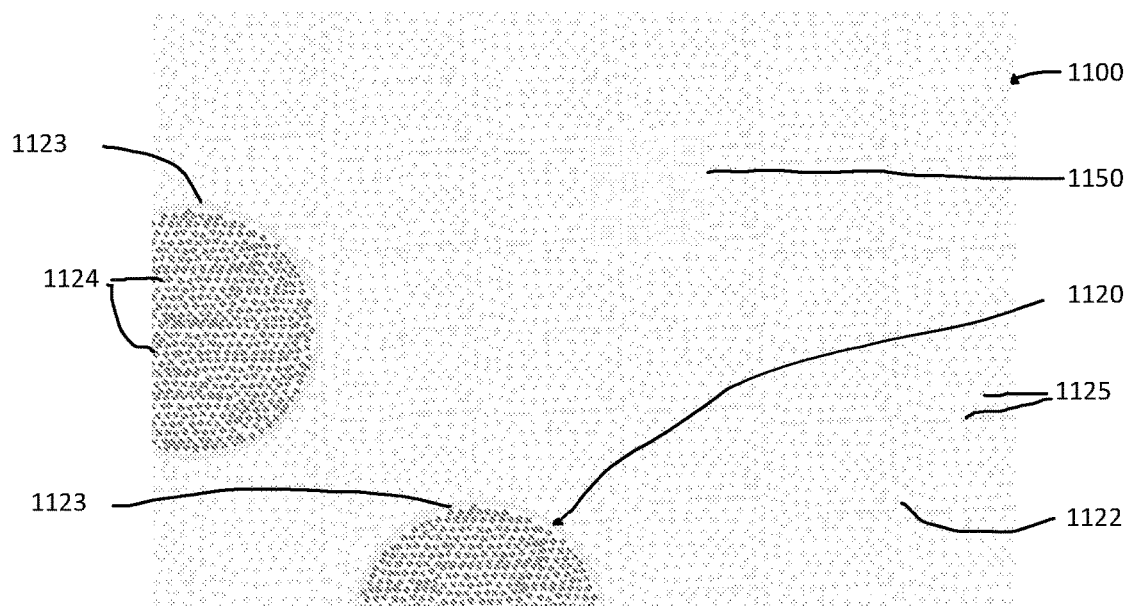
FIG. 21 is a depiction of the surface and logo shown in FIG. 19, including an embedded QR code provided for for local orientation and alignment with previous measurements.

Embodiments of the invention include applying a pattern to a surface, such as the aircraft surface (see FIGS. 22-25, for example). The pattern preferably may display on the surface the colors and design desired by a company for its logo, or for the coloring of its aircraft, or any other design. The pattern preferably includes an arrangement of random dots, points or other shapes, or combinations thereof. Pointillism patterning is shown in FIG. 20 of the enlarged partial view of the depiction of the surface shown in FIGS. 18-19, which in FIG. 20, in the enlarged zoomed in view, shows the individual elements 1124, e.g., dots and the like, forming the pattern design 1121 comprising an arrangement of circles 1123. The dots 1124 are shown comprising an arrangement of a first plurality of elements, e.g., dots, forming the design of circles 1123, and a second plurality of elements, such as the dots 1125, forming the background or field 1122 on which the circles 1123 appear. The design 1121 also may include one or more codes that may be included in the pattern (in the background or in the circles or other location on the panel). For example, as shown in FIG. 21, an embedded QR code 1150 is provided for local orientation and alignment with previous measurements. The QR code 1150 may also contain information about the structure (such as the aircraft) and also may be used to provide an alignment point for the visual alignment of a camera or optical measuring device that aligns the location of the structure, such as the aircraft, on which the indicia has been applied, with the QR code and another point (or other code) to determine the positions of the points or shapes forming the patterns (and the movement or changes in position). The pointillism application of the paint to a surface of a structure, such as an aircraft surface, may provide an aesthetic appearance, as well as provide information in the form of patterns (preferably random patterns, that may be measured with an imaging device as discussed herein. The invention also improves the operation of the computer by providing a desired design, such as an aircraft logo, that is applied using a paintjet operated with a computer, which also applies a digital imaging pattern, with alignment codes or indicia, so that the operation not only paints the aircraft or structure, but the painting is carried out to perform the digital imaging correlation patterning for the imaging apparatus. The computer system therefore images the structure, such as the aircraft, as the structure exists in its operating environment without the application of strain gauges or other sensors, and therefore utilizes less data input sources, such as gauges, and tools or sensors that would otherwise require positioning and removal from the structure, and may carry out structural health monitoring at a faster rate, with even more data points.

In FIG. 21, there is depicted a QR code 1150 that is provided as comprising the indicia on the structure surface, and preferably is applied using the method for application of the pattern. According to preferred implementations, a QR code may be applied using a suitable painting method, such as the preferred paintjet method. Although a single QR code 1150 is shown in the depiction in FIG. 21, a plurality of QR codes may be provided and applied on the surface. According to preferred embodiments, a QR code (or multiple QR codes) may be applied as part of the pattern, and the QR code may be programmed to print as part of the design, logo, or other indicia that is applied to the surface of a structure. For example, aircraft surfaces may be painted with a pattern, and one or more QR codes may be applied therewith. The QR code may be provided in a specified location, or may be provided in a location where the pattern or indicia being applied will not be disrupted by the presence of the QR code. The QR code 1150, as discussed herein, may serve as an alignment mechanism to provide the location on the surface structure, or for use in identifying a camera location relative to the structure or a location on the structure. The QR code additionally or alternatively may include a designation or link to information about the structure, or may contain coded information about the structure, or a particular element or item of the structure or other characteristic or property.

Application of the design onto a surface may be applied using any suitable method. Preferred examples include using a screen (see FIG. 3), and preferred embodiments may apply the pattern or design using a paintjet application method, while yet other embodiments may apply a pattern or design utilizing a pre-printed sheet that is laminated or thermoformed onto a surface or other structure, such as one or more other sheets of a composite.

Figure 22:
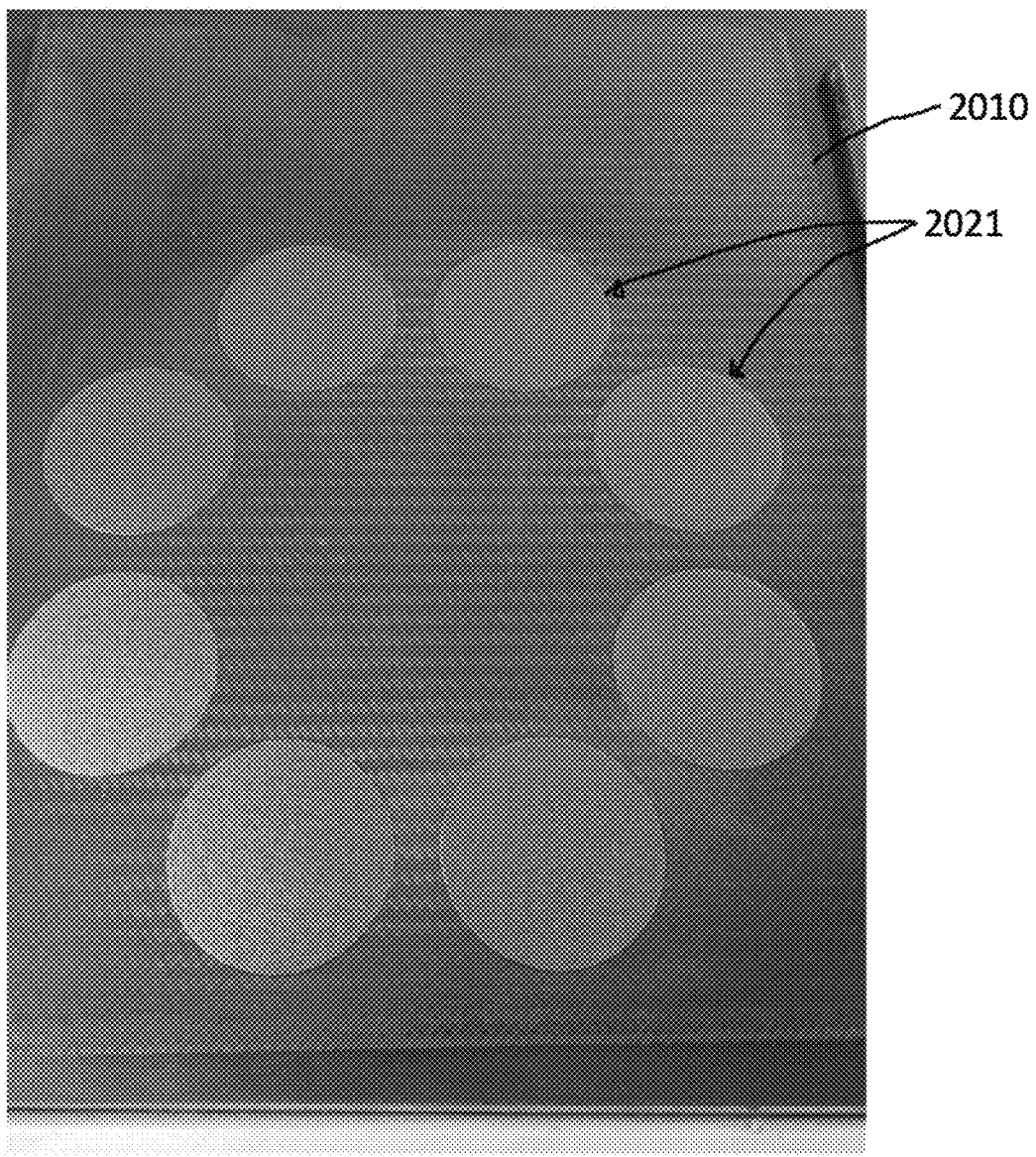
FIG. 22 is a perspective view of an aircraft panel showing an exemplary depiction of design thereon formed by a plurality of dots or shapes in a random pattern.
Figure 23:
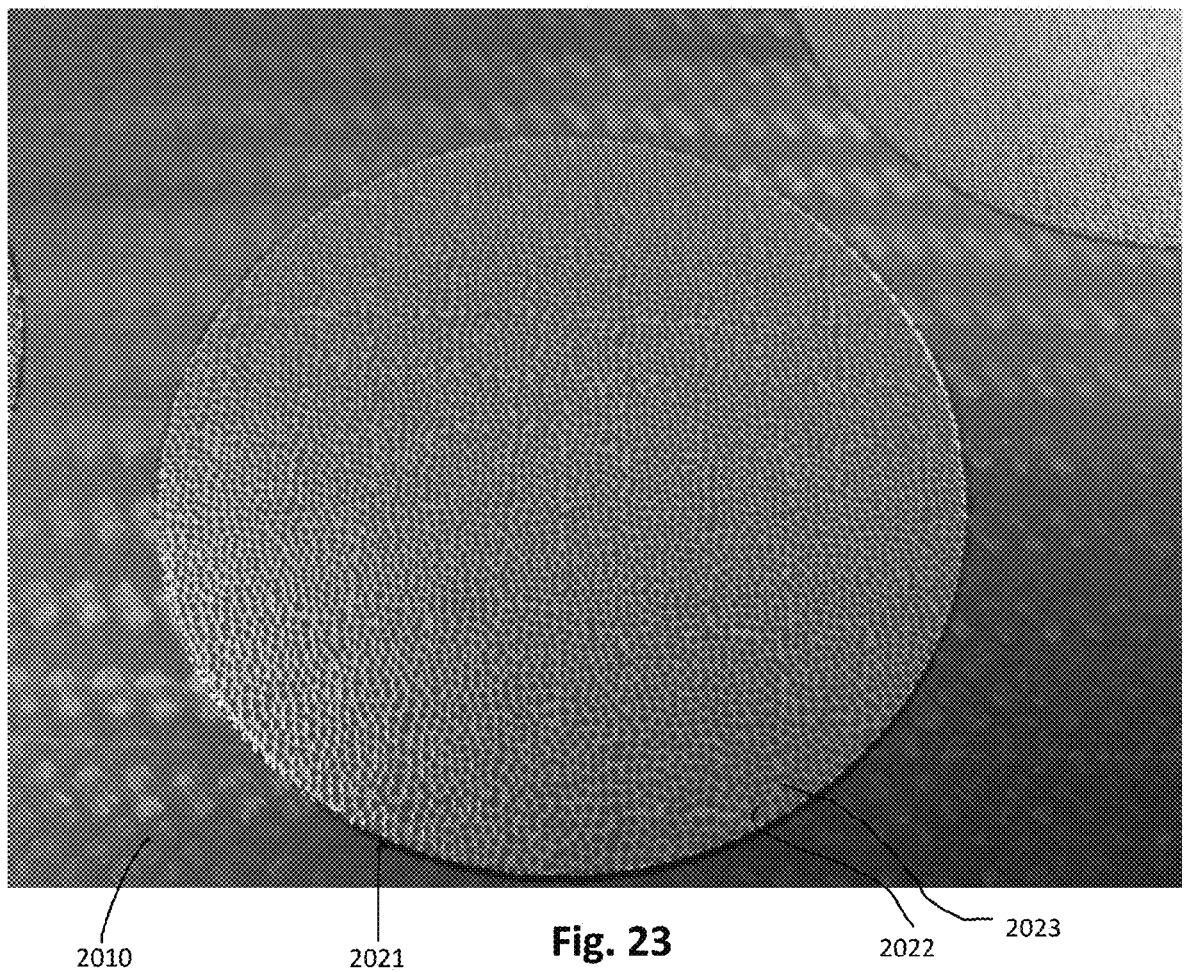
FIG. 23 is an enlarged partial view of the panel shown in FIG. 22, zoomed in to shown the pattern.
Figure 24:
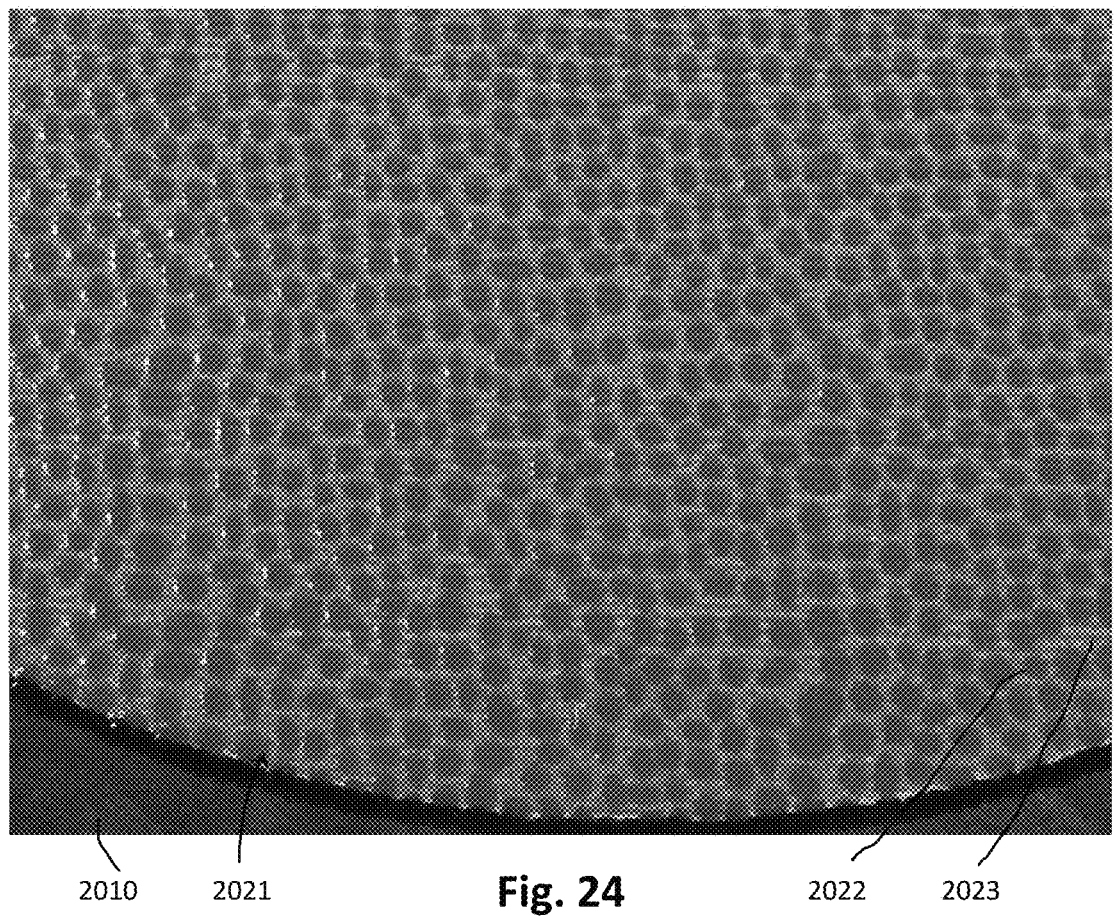
FIG. 24 is another enlarged zoomed in view of a portion of the panel shown in FIG. 22, zoomed in further to show the elements forming the design for structural health monitoring.
Figure 25:
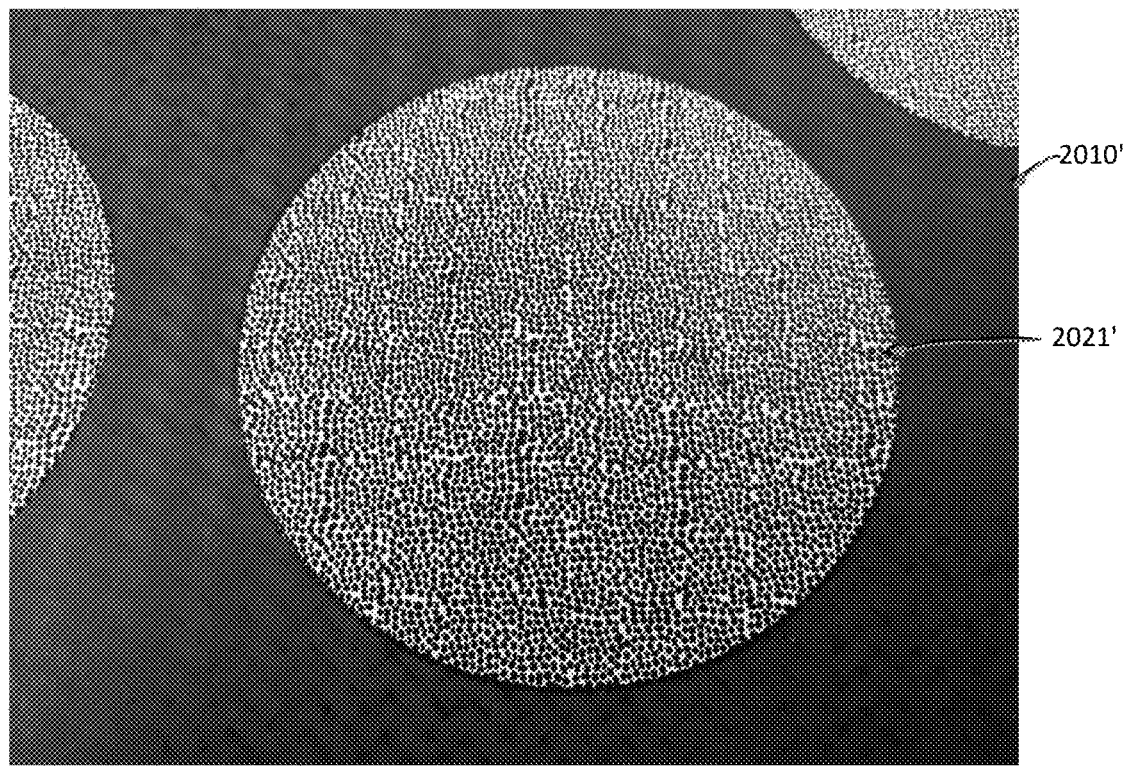
FIG. 25 is a view of the panel shown in FIG. 24, but zoomed out, and depicted in a black and white scale.

An example of an aircraft panel 2010 is shown in FIG. 22 with indicia thereon comprising a design 2021. The panel 2010 is a tail section of an aircraft and has the design 2021 on its surface (similar to the design 1121 shown in FIGS. 18-21). The design 2021 although shown comprising geometric shapes, a ring of circles, may comprise other designs. The aircraft panel design 2021 is formed by a plurality of smaller elements that comprise discrete shapes, such as points or dots, or other shapes. The discrete elements allow for the design to be displayed and are used to carry out structural health monitoring of the structure, which in FIG. 22 is the aircraft panel 2010. The panel 2010 though shown separately from the aircraft to which it may comprise a portion of, may be monitored when it is constructed and when it is in use as an aircraft that includes the panel 2010. An aircraft, for example, may be constructed using pre-printed panels that are pre-patterned, or may be patterned after it is constructed, such as, for example, existing already constructed aircraft that are to be monitored by applying a pattern thereon, and monitoring the structural health of the aircraft over time by imaging the pattern and carrying out DIC. FIGS. 23-25 show alternate views of the panel 2010, with enlarged views of the design and design elements forming the design pattern. The circles of the design 2021 are shown formed by a first color for the elements or dots 2022 and a second color which, in this example, is similar to the first color but lighter, and provides contrast for the surface adjacent to the dots 2022. The background 2023 appearing within the circle and behind the elements 2022 is shown comprising a contrasting color, which in this example is a contrasting color similar to the color of the first elements 2022. Although an arrangement of two contrasting colors or shades is shown in FIG. 22-25, other numbers of colors may be provided.

Figure 27:
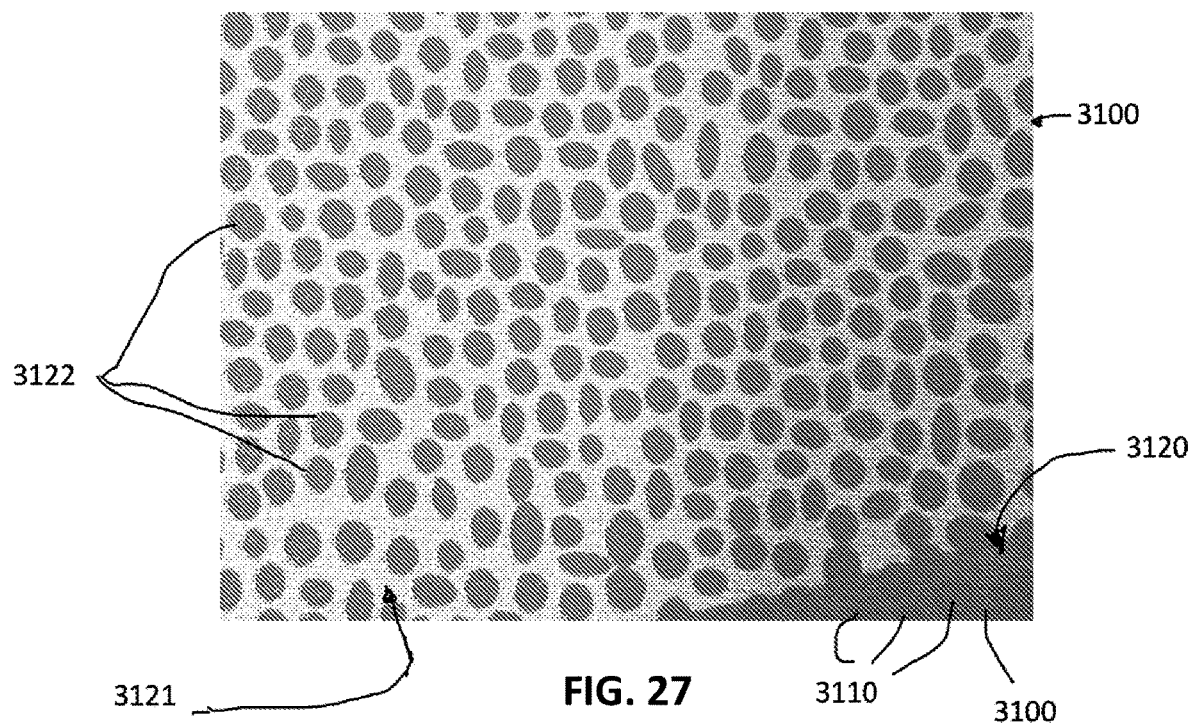
FIG. 27 is a depiction of an alternate application of elements to form a design for use in connection with structural health monitoring.
Figure 26:
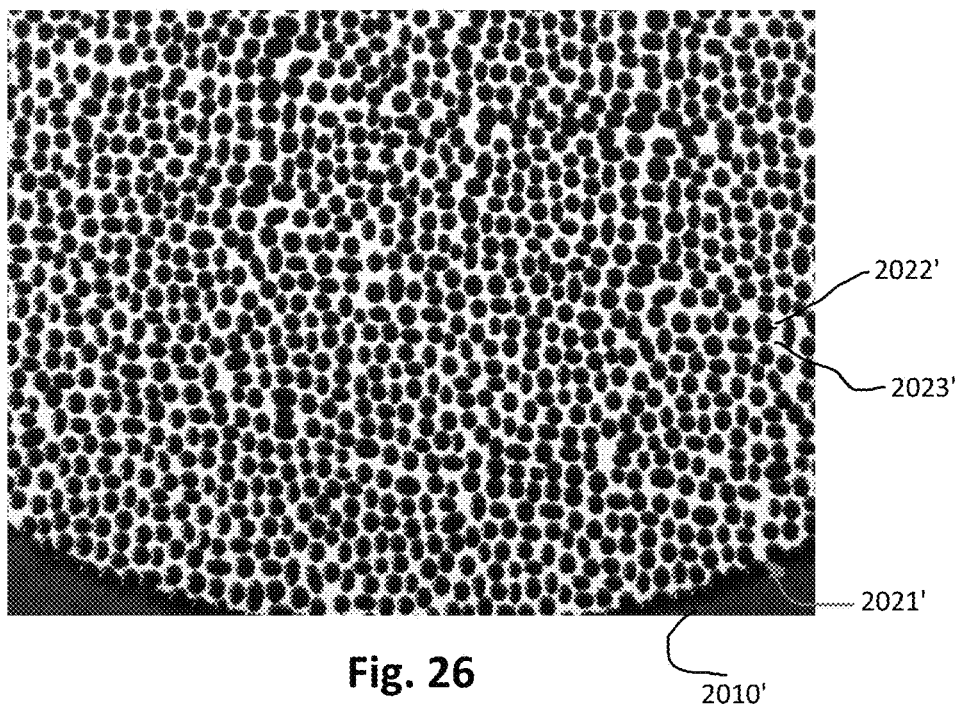
FIG. 26 is a view of the panel show in FIG. 25, but zoomed in to show the elements of the pattern.

Referring to FIGS. 26 and 27, the panel 2010 shown in FIGS. 22-25 is represented as panel 2010', but is depicted in a black and white contrast image, where the design 2021' appears showing the design elements in a high contrast form, with the background being a light or "white" field. The plurality of elements 2022' are shown forming the design, and the field 2023' on which the elements 2022' appear. In instances where a high contrast is desired, filters, as described herein, may be used to enhance the contrast, and/or a background field may be painted with a contrasting color use (for example, an opposite color of the spectrum for the design color or colors).

Referring to FIG. 28, an alternate painting application is depicted showing a plurality of shapes (e.g., small dots) 3110 arranged on a panel surface 3100 to form a design 3120. The plurality of shapes are shown in a first color, and appear on a field 3111 having a second color, which is similar in hue or color spectrum to the first color of the shapes 3110 but is lighter, and therefore there is a contrast between the first shapes 3110 and the background field or second shapes forming the background field 3111. In the depiction the plurality of shapes 3110 are imaged to provide a base for subsequent strain measurements to identify movements or changes in the structure or portion thereof being monitored. A background 3121 is depicted having a white field and comprising a plurality of background elements (e.g., shown as dots) 3122.

According to some embodiments, as discussed herein, the implementation of the CAD coordinates may be used to determine the location that corresponds with the location on the aircraft. An alignment of the patterned image to the structural coordinates may be carried out, and may be implemented with the RVAT system, as referenced herein. For example, alignment and imaging may be implemented utilizing coded markers that provide an alignment point (with one or more other coded markers, or other point or location on a structure). The patterning implemented with the pointillism may be used to provide an initial baseline, and may be used subsequently to monitor strain by imaging the surface to ascertain the positioning of the pattern, such as the random dots, shapes or points.

According to some preferred embodiments, the pattern may be applied with a suitable application mechanism. A robot head that follows the surface (either while the surface itself is stationary or is moving) and applies a coating, such as paint, to the surface in the form of the patterned dots, shapes or points, may be used to paint a surface. The robot head may include jets or nozzles that dispense by atomizing or streaming with air, pressure or gas, paint to produce the desired dot in the desired color on the surface. The pattern preferably may be applied with a single pass using multiple nozzles to deliver one or more colors and/or shapes of the pattern, or according to alternate embodiments, may make more than one pass, such as making a plurality of passes, to deliver colors separately, or in groups of colors. A computer may be programmed with the desired indicia to be applied to the structure surface, such as the aircraft panel (in FIG. 22). The computer may instruct and operate the robot to apply the desired pattern to the surface. The patterning may be applied as a feature or function of the RVAT system, and may be applied in conjunction with the CAD for the structure or part being patterned (e.g., to pattern or apply a design in a desired location of a structure, e.g., such as an aircraft). However, according to some implementations, the patterning may be applied without regard to the CAD or the location of the pattern, and the initial and subsequent imaging is utilized to conduct structural health monitoring determinations. The patterning preferably remains on the structure during the utilization of the structure, such as for example, when the structure is placed into service and is operational. In the case of an aircraft, the aircraft may be periodically evaluated by imaging the pattern. An initial image preferably is taken when the aircraft is constructed, or when the patterning is applied to an aircraft (as the method may be carried out for new products, such as a newly constructed aircraft), a single part, or an already constructed and operational aircraft (which may receive a new paint job, or invisible type patterning (e.g., a UV coating or the like) on top of the original paint). The discrete elements, such as for example, dots, shapes or points preferably form an image by spacing apart points, dots or shapes from each other, so that instead of having a solid area of color, or a large solid shape, the points, dots or smaller shapes from an adjacent points, dots or shapes are separated. The elements also may partially overlap or touch each other. The contrast between the constituents forming the pointed image is utilized to identify the discrete point (or dot or shape), and to identify the constituents of the random pattern. Although the pattern is random, it produces a well-defined image when viewed. Filters may be utilized during the imaging process to further enhance the contrast of the discrete pattern elements (i.e., dots, points or shapes). For example, where a background has a particular color to be set off from elements that may be similar in color appearance but have different colors therein (and exhibit different spectral wavelength reflectance), the contrast may be enhanced for imaging using an absorption filter that absorbs unwanted wavelengths, or an interference filter that removes one or more selected wavelengths by internal destructive interference and reflection. The light modulating filtration may be utilized to facilitate the imaging of the light utilized for imaging, such as white light, as well as infrared or other light that may be used in conjunction with the imaging equipment. For example, in order to increase contrast of a particular color, an opposite spectral absorption filter may be used, e.g., a magenta filter to filter out green light from passing (by absorbing the green light), and thereby allowing other wavelengths, e.g., red and blue, to pass. Alternatively, an interference filter may be used to reflect and destructively interfere with the wavelengths (e.g., such as red and blue), and allow green to pass through. These are examples, and the filtering may be carried out with filters suitable for the patterning, colors and light being used to image the structure.

In addition, the combination of the filter utilization with paint augmentation may be implemented. For example, a slight orange color tint may be added to a paint in order to enhance the appearance of a blue colored element, due to orange being the opposite of the blue, or a color that the blue shadow would encompass. Therefore, in some instances, where the color design applied is made of smaller elements a filter may be used in the imaging process to enhance the contrast of the elements, while according to other implementations, a slight tint may be provided in the paint of the elements forming the design or a part thereof, or the background elements (forming the field or background). According to preferred embodiments, both a tint in the paint and a filter may be used. For example, in some applications, in order to get a white appearing background, slight tints of white that contain opposite colors, such as blue and orange may be used. Filters may be used to enhance a color or contrast. One example is that with an orange filter, the contrast difference is increased, making the white blue (white with blue tint) darker, and the white orange (white with orange tint) brighter, so that the imaging system (such as the ARAMIS imaging system) may therefore undertake structural health monitoring so that DIC may be applied in accordance with the methods herein to measure the degree of strain or changes in a structure, while the applied paint (including any tinted whites), from a distance looks white to persons viewing it. According to implementations, where, for example, printing applications such as paintjet or inkjet and/or robotic applications are used to apply or print the indicia onto a surface, designs or logos may be added as part of or to comprise the indicia. Examples of the designs may comprise logos or customized paint designs, which may be formed utilizing dots or applied with other dots comprising the logo or background. The applied indicia may be like Seurat making any logo or picture. In addition, unique coding, such as QR codes, may be included as part of the paint or ink application to provide locational information with the same slight variations and filtering, and including alignment referencing as discussed herein.

According to an alternate implementation, the patterning designs that are used to carry our structural health monitoring according to the invention and embodiments depicted, may be done using a painted sheet application. As pointed out, the implementation of optical structural health monitoring (SHM) involves a pattern on the material surface that is used to monitor changes in shape, displacement and strain during manufacturing and in service. According to an alternate implementation, a method of pre-painting a composite surface is carried out to apply a pattern onto the surface using a painted urethane sheet as a layer of the composite build. According to preferred implementations, the painted urethane sheet layer comprises the first layer of a composite build, and may, for example, be placed against a tool used to apply it, with, typically, carbon-epoxy thermoset sheet layers on top create the composite part. The part with the layer arrangement is further processed, for example, preferably by curing. In a preferred implementation, the part is then cured, and the resultant part comes out of the tool painted. A typical brand of the urethane sheet material is called Surface Master by Solvay Composites. The urethane bonds into the composite surface leaving the paint well adhered. One commercially available urethane that may be used is a urethane sheet material sold under the brand Surface Master® by Solvay Composites. According to some embodiments, the pre-patterned layer may comprise a film, such as an epoxy film, with preferred film being a urethane layer comprising a film which has the pattern pre-printed on the film. The pattern may be pre-patterned on a urethane layer, and, according to some embodiments, the pre-patterned urethane layer may be the first or last layer of a composite layup, such as graphite epoxy or fiberglass.

The present method, system and devices for optical structural health monitoring, according to some implementations, may utilize the patterning method to apply the pattern. According to some embodiments, a patterning method may be used to pre-pattern the urethane sheeting so that the cured composite part has a perfect pattern on every part. A suitable patterning indicia may be applied for use on the urethane sheet that is to be pre-patterned. For example, the indicia may involve any suitable pattern shown and described herein, including the pointillism patterns (of dots, shapes and/or points). Patterning may be standard DIC black-on-white, complex multi-color "Seurat" patterning or UV patterning. In addition, generic 2D-Barcodes (such as Trilion codes) or coded markers may also be spread throughout the patterning for local positioning and part recognition.

According to preferred embodiments, pre-patterning of indicia may be applied to a sheet, such as the urethane or composite sheet that is used to form a surface of the structure. The surface may be an inner surface or outer surface of the part being formed or constructed, or in some cases both. In this manner, the structural health monitoring may be measured using one or more surfaces of the part. For example, an aircraft part may be formed with a first surface and a second surface, where a urethane pre-patterned composite layer is provided to comprise an exterior or first surface and a urethane pre-patterned composite layer also is provided to comprise the interior or second surface. According to some embodiments, outer layers may be imaged from an exterior, and according to some embodiments, the interior surfaces or other structural surfaces may be imaged using x-ray (CT). For example, a metallic paint or additive (or other component that may be imaged using x-ray imaging may be used in the paint or ink patterning a surface. In particular an interior surface, or a hidden or obstructed surface, may be patterned with the x-ray image capable pattern. The pattern may comprise any of the patterns shown and described herein, including the codes, dots and/or indicia. DIC may be conducted from the x-ray imaging of these patterns.

According to some embodiments, a pre-patterned sheet or film is provided with indicia comprising a random pattern or dots or other elements for carrying out SHM. The pre-patterned sheet may be applied to an already existing structure to enable SHM measurements to be taken. Embodiments of the method may include applying the pre-patterned sheet to the structure, and articles may include a pre-patterned sheet that may be applied to a structure. Some examples of structures include bridges, roadways, runways and buildings.

Generic 2D-barcodes, such as generic Trilion 2D-Barcodes, comprise a preferred method, as these codes may have a globally unique identification number, which can later be linked to the specific part and location, including according to preferred embodiments, in the Digital-Twin database, typically during initial scanning of the cured part to obtain it true dimensions (measured mesh relative to CAD design), baseline the pattern and capture the generic barcodes, and assigning all of this data to the part serial number in the Digital-Twin database. (The Digital-Twin is referenced in my co-pending U.S. patent application Ser. No. 62/612,181, filed on Dec. 29, 2017, and my co-pending U.S. patent application Ser. No. 16/236,072, filed on Dec. 28, 2018.)

The structural health monitoring carried out using a pre-patterning method provides advantages. One advantage is that the pre-patterning of the composite samples allows the SHM to begin just after curing, just when the part has become a new part (i.e., a newly constructed part). This allows for the part to be able to be monitored throughout the manufacturing process for changes in 3D shape, distortions, strains and fracture, from a number of conditions or events. For example, during a manufacturing process, a part may be subjected to handling damage (as parts may be mishandled, e.g., accidentally dropped from significant height, e.g., 10', picked up and then installed on the aircraft). A mishandled part may look fine to a visual inspection, and the part may be applied or used to form the structure. With the pre-patterning of the part according to embodiments herein, structural health monitoring of the mishandled part may be used to identify whether any damage has occurred and if so, the nature and extent of the damages (is it within suitable tolerances for continued use of the part, or must the part be repaired, or scrapped). As with the embodiments described herein, determining the suitability of a part during a manufacturing operation, may avoid wasting material and assembly line or personnel time, where a part if completed would be ultimately unsuitable for use (or in worse cases, may be defective and utilized only to fail). The present method also enables determinations of structural health monitoring to monitor installation distortions and strains during a construction procedure (as many times parts are forced into position to meet positional requirements, but deform or damage the part). The pre-patterning also serves for structural testing of critical components (post-test damage assessment, dynamically during testing, vibration studies). The methods, systems and devices, including the utilization of the pre-patterning allow for documenting of a final manufactured base-line for lifelong SHM in service; first flight checkout; regular service checks; and life extension validation (where pre-determined norms may be exceeded, or diminished, as a result of the monitoring and deviations from the original structure, and/or subsequent monitoring points in time).

The coatings applied to produce the pattern may comprise a paint, ink or dye, or other suitable coating that may be applied to the structure or composite that is used to construct a part or structure, such as where a urethane panel is used.

Although implementations have been shown and described in connection with invisible coatings, such as, for example, UV coatings (paints and ink), according to other embodiments, the system, method and devices may be implemented to carry out structural health monitoring, with visible coatings applied to the substrate (with the features shown and described in connection with the UV coated embodiments). These implementations may be used where the object being patterned and monitored is not in public use, or other situations where the pattern and/or code visibility does not need to be hidden.

What is claimed is:

1. A method for conducting structural health monitoring of a substrate, comprising:
  a) designating a substrate or portion thereof to be monitored;
  b) applying a pattern on the substrate or portion thereof that comprises one or more of a design element or background provided on one or more locations on the surface of the substrate or portion thereof;
  c) imaging the pattern with equipment that captures the image of the pattern;
  d) storing the image captured in step c);
  e) wherein the pattern applied comprises a pattern of discrete elements which is applied to form the one or more of a design element or background by pointillism, and wherein the substrate or portion thereof is imaged with said imaging equipment to identify strains and deformations of the substrate at the one or more locations of the substrate or portion thereof where the said one or more pointillized design element or background is applied;
  f) including determining from the imaging the presence of or the extent of strain or deformation of the substrate or an area of the substrate or portion thereof at the one or more locations of the substrate or portion thereof where the pointillized design element or background is applied, and
  g) wherein determining the presence of or the extent of strain or deformation is carried out on a substrate that is or comprises an in service object.

2. The method of claim 1, including determining from the imaging the presence of or the extent of strain or deformation of the substrate or an area of the substrate or portion thereof at the one or more locations of the substrate or portion thereof where the pointillized design element or background is applied, wherein said image captured of said pattern imaged is aligned to correspond with at least one or more locations of the structure, and wherein the method includes aligning a prior image of the substrate to correspond with said one or more substrate locations, and wherein said determining the presence of or the extent of strain or deformation of said substrate or said area of said substrate comprises comparing the imaged pattern with said prior imaged pattern.

3. The method of claim 2, including storing the image captured in step c) in a database;
  wherein steps c) and d) are repeated over time intervals, and wherein monitoring of one or more conditions of the substrate or portion thereof is carried out;
  wherein said database comprises imaging results that include historical imaging results for said monitoring of said one or more conditions; and
  monitoring one or more conditions by conducting Digital Image Correlation (DIC) or thermography NDT to compare one or more historical imaging results to a current imaging result; and
  determining whether slight changes of the substrate or portion thereof, or a structure formed from said substrate have taken place;
  wherein the historical imaging results for the substrate or portion thereof to be monitored are stored in a database, and wherein determining changes includes identifying slight changes of said captured image from the historical measurements of historical imaging results stored in said database, wherein said changes are determined by Digital Image Correlation (DIC) or thermography NDT.

4. The method of claim 3, conditions by conducting Digital Image Correlation (DIC) or thermography NDT.

5. The method of claim 4, using an existing pattern in the material or structure, such as the natural patterns in asphalt or concrete for measurement with DIC.

6. The method of claim 4, using the natural thermal changes in a material structure for thermography NDT such as the solar warming of a bridge deck.

7. The method of claim 2, wherein said structure comprises a composite structure, and wherein said pattern is applied to the composite structure during the construction process of said structure.

8. The method of claim 7, wherein said composite structure is formed by a plurality of layers and wherein at least one layer includes said pattern.

9. The method of claim 8, including pre-applying said pattern to said at least one layer that includes said pattern, and constructing said composite structure by attaching said at least one layer that includes the pattern thereon to at least one other layer, wherein said at least one layer that includes the pattern comprises an outermost layer, and wherein said at least one other layer includes a pattern thereon.

10. The method of claim 9, wherein said at least one additional layer comprises an innermost layer of the composite structure.

11. The method of claim 8, including pre-applying said pattern to said at least one layer that includes said pattern, and constructing said composite structure by attaching said at least one layer that includes the pattern thereon to at least one other layer, wherein said at least one layer that includes the pattern comprises an outermost layer or an innermost layer of the composite structure.

12. The method of claim 11 wherein attaching said at least one layer that includes the pattern thereon to at least one other layer comprises autoclaving the layers together so that the said outermost or innermost layer having the pattern thereon comprises an outer surface of the composite structure.

13. The method of claim 12, wherein said at least one layer that includes the pattern thereon comprises a thermoset epoxy layer.

14. The method of claim 13, wherein the thermoset epoxy layer comprises urethane, and wherein the pattern is pre-printed on a urethane layer as the first or last layer of a composite layup, such as graphite epoxy or fiberglass.

15. The method of claim 14, wherein said epoxy layer comprising urethane is a film having the pattern pre-printed thereon.

16. The method of claim 1, wherein the pattern is applied by applying a urethane composite film having the pattern pre-printed thereon.

17. The method of claim 1, wherein the pattern comprises one or more of a pattern of random dots and one or more codes, wherein said one or more codes include unique QR codes to locate where on the structure the data is being taken, wherein said code comprises at least one QR code defining a QR code area of the pattern on the substrate on which the QR code is located, and wherein structural health monitoring uses said at least one QR code to identify a structural health condition within the area of the structure that is within the QR code area, and wherein historical data is recalled for a baseline comparison of said image of said pattern.

18. The method of claim 17, wherein said pattern comprises an invisible pattern.

19. The method of claim 1, wherein said pattern comprises an invisible pattern.

20. The method of claim 19, wherein the invisible pattern comprises a pattern of a UV coating.

21. The method of claim 20, wherein the UV coating is a UV paint, ink or dye.

22. The method of claim 20, wherein the pattern is formed in the pattern areas by applying a UV paint.

23. The method of claim 1, wherein said pattern applied to the substrate comprises a design, and wherein said design is formed by a plurality of spaced apart discrete points, dots or elements.

24. The method of claim 23, wherein said plurality of spaced apart discrete points, dots or elements are applied on a field, wherein said plurality of spaced apart discrete points, dots or elements exhibit contrast from said field.

25. The method of claim 24, wherein imaging includes filtering the image capture of said plurality of spaced apart discrete points, dots or elements applied on said field to increase contrast, wherein filtering includes placing an optical filter of a color that increases contrast between the discrete points, dots or elements applied and said field.

26. The method of claim 1, wherein said pattern is provided on a sheet, and wherein said sheet is used to form said structure.

27. The method of claim 1, wherein imaging the pattern with equipment that captures the image of the pattern is carried out using a robot.

28. The method of claim 27, wherein imaging the pattern with equipment that captures the image of the pattern is carried out using a mobile robot to measure ever part of a structure or vehicle.

29. The method of claim 1, wherein imaging the pattern with equipment that captures the image of the pattern is carried out using an inspection drone, the inspection drone being controllable or pre-programmed to image the substrate being monitored or a portion of the substrate, and implementing DIC to determine a structural health condition of the substrate, and wherein the method includes operating an inspection drone to image the pattern on the substrate.

30. The method of claim 1, wherein imaging the pattern with equipment that captures the image of the pattern is carried out using a space-based inspection drone, the inspection drone being controllable or pre-programmed to image the substrate being monitored or a portion of the substrate, and implementing DIC to determine a structural health condition of the substrate, and wherein the method includes operating an inspection drone to image the pattern on the substrate.

31. The method of claim 1, wherein applying the pattern to said substrate comprises placing a vinyl sheet or vinyl wrap as a template on said substrate, wherein said vinyl sheet or vinyl wrap contains openings corresponding to the pattern to be applied, and applying the coating over the vinyl sheet or wrap and through the openings.

* * * * *